US007208200B2

(12) United States Patent
Kools

(10) Patent No.: US 7,208,200 B2
(45) Date of Patent: Apr. 24, 2007

(54) PROCESS OF FORMING MULTILAYERED STRUCTURES

(75) Inventor: Willem Kools, Winchester, MA (US)

(73) Assignee: Millipore Corporation, Bedford, MA (US)

( * ) Notice: Subject to any disclaimer, the term of this patent is extended or adjusted under 35 U.S.C. 154(b) by 137 days.

(21) Appl. No.: 10/635,736

(22) Filed: Aug. 6, 2003

(65) Prior Publication Data

US 2004/0084364 A1 May 6, 2004

Related U.S. Application Data

(63) Continuation of application No. 10/275,210, filed as application No. PCT/US01/16817 on May 22, 2001.

(60) Provisional application No. 60/206,623, filed on May 24, 2000.

(51) Int. Cl.
*B05D 3/00* (2006.01)
*B29C 65/00* (2006.01)
*B01D 29/00* (2006.01)

(52) U.S. Cl. ............... 427/294; 427/244; 427/245; 427/356; 264/41; 264/212; 264/171; 210/490

(58) Field of Classification Search .......... 210/490, 210/500.41, 500.36, 500.38, 500.37, 500.42; 264/45.1, 41, 212, 171; 427/244, 356, 294, 427/245; 118/411
See application file for complete search history.

(56) References Cited

U.S. PATENT DOCUMENTS

| 2,806,256 | A | 9/1957 | Smith-Johannsen |
| 3,347,391 | A | 10/1967 | Steensen |
| 3,948,823 | A | 4/1976 | Lee et al. |
| 4,203,847 | A | 5/1980 | Grandine, 2nd |
| 4,203,848 | A | 5/1980 | Grandine |
| 4,261,834 | A | 4/1981 | deWinter |
| 4,340,479 | A | 7/1982 | Pall |
| 4,340,480 | A | 7/1982 | Pall et al. |
| 4,489,671 | A | 12/1984 | Choinski |
| 4,629,563 | A | 12/1986 | Wrasidlo |
| 4,666,607 | A | 5/1987 | Josefiak et al. |
| 4,707,265 | A | 11/1987 | Barnes, Jr. et al. |
| 4,770,777 | A | 9/1988 | Steadly et al. |
| 4,774,039 | A | 9/1988 | Wrasidlo |
| 4,933,081 | A | 6/1990 | Sasaki et al. |
| 4,983,288 | A | 1/1991 | Karbachsch et al. |

(Continued)

FOREIGN PATENT DOCUMENTS

JP   56-91815   7/1981

(Continued)

OTHER PUBLICATIONS

Brock, "Membrane Filtration: A User's Guide and Reference Manual," Chapter 3, pp. 29-35 (1983).

(Continued)

*Primary Examiner*—Ana Fortuna
(74) *Attorney, Agent, or Firm*—Nixon Peabody LLP

(57) ABSTRACT

The present invention provides for a method of producing an integral multilayered porous membrane by simultaneously co-casting a plurality of polymer solutions onto a support to form a multilayered liquid sheet and immersing the sheet into a liquid coagulation bath to effect phase separation and form a porous membrane. The support can be a temporary support or form an integrated support for the membrane. The plurality of layers may be of the same polymer or different, same concentration or viscosity or different and may be subjected to the same processing conditions or different ones to form unique structures.

20 Claims, 16 Drawing Sheets

U.S. PATENT DOCUMENTS

| | | |
|---|---|---|
| 5,013,339 A | 5/1991 | Mahoney et al. |
| 5,228,994 A | 7/1993 | Tkacik et al. |
| 5,240,615 A | 8/1993 | Fishman |
| 5,256,357 A * | 10/1993 | Hayward ............... 264/172.19 |
| 5,273,657 A | 12/1993 | Nakashima et al. |
| 5,444,097 A | 8/1995 | Tkacik |
| 5,489,406 A | 2/1996 | Beck et al. |
| 5,500,167 A | 3/1996 | Degen |
| 5,514,461 A | 5/1996 | Meguro et al. |
| 5,550,167 A | 8/1996 | DesMarais |
| 5,620,790 A | 4/1997 | Holzki et al. |
| 5,626,805 A | 5/1997 | Meguro et al. |
| 5,736,051 A | 4/1998 | Degen et al. |
| 5,741,549 A * | 4/1998 | Maier et al. ................. 427/294 |
| 5,834,107 A * | 11/1998 | Wang et al. .............. 428/310.5 |
| 5,846,422 A * | 12/1998 | Ditter et al. ........... 210/500.41 |
| 5,869,174 A | 2/1999 | Wang |
| 5,886,059 A | 3/1999 | Wang |
| 5,906,742 A | 5/1999 | Wang et al. |
| 5,958,989 A | 9/1999 | Wang et al. |
| 5,962,075 A * | 10/1999 | Sartor et al. ................. 427/356 |
| 5,979,670 A | 11/1999 | Ditter et al. |
| 6,045,899 A * | 4/2000 | Wang et al. .............. 428/315.7 |
| 6,056,529 A | 5/2000 | Meyering et al. |
| 6,090,441 A | 7/2000 | Vining, Jr. et al. |
| 6,110,369 A | 8/2000 | Ditter et al. |
| 6,277,281 B1 | 8/2001 | Ditter et al. |
| 6,440,306 B1 | 8/2002 | Ditter et al. |
| 6,464,084 B2 | 10/2002 | Pulek |
| 6,497,752 B1 | 12/2002 | Kessler et al. |
| 6,513,666 B2 | 2/2003 | Meyering et al. |
| 6,536,605 B2 | 3/2003 | Rice et al. |
| 6,565,782 B1 | 5/2003 | Wang et al. |
| 6,706,184 B2 | 3/2004 | Sale et al. |
| 6,736,912 B1 | 5/2004 | Fields et al. |
| 6,736,971 B2 | 5/2004 | Sale et al. |
| 6,939,468 B2 | 9/2005 | Wang et al. |
| 2002/0113006 A1 | 8/2002 | Sale et al. |
| 2002/0127387 A1 | 9/2002 | Sale et al. |
| 2003/0035943 A1 | 2/2003 | Jones et al. |
| 2003/0209485 A1 | 11/2003 | Kools |
| 2003/0217965 A1 | 11/2003 | Kools |
| 2004/0124135 A1 | 7/2004 | Sale et al. |
| 2005/0040100 A1 | 2/2005 | Kools |
| 2006/0086657 A1 | 4/2006 | Kools |

FOREIGN PATENT DOCUMENTS

| | | |
|---|---|---|
| JP | 60-76323 | 4/1985 |
| JP | 60-132605 | 7/1985 |
| JP | 62-11617 | 8/1994 |
| JP | 09-24260 | 1/1997 |
| JP | 09024260 | 1/1997 |
| WO | WO 94/09880 | 5/1994 |
| WO | WO 98/30379 | 7/1998 |

OTHER PUBLICATIONS

Kools, "Membrane Formation by Phase Inversion in Multicomponent Polymer Systems, Mechanisms and Morphologies," Thesis, pp. 1-191, Feb. 27, 1998.

Cohen, "Two-Layer Slot Coating: Flow Visualization and Modelling," Thesis, University of Minnesota, Dec. 1993.

Gröbe et al., "Ein neues Prinzip für die Herstellung von asymmetrischen Polymermembranen," *Acta Polymerica* 30:62-63 (1979).

Gröbe et al., "Multilayer Membranes I. A New Type of Asymmetric Synthetic Membranes," *Synthetic Polymeric Membranes*, Ed. B. Sedlacek, J. Kahovec, Walter Gruyter & Co., Berlin, (1987).

Hiatt et al., "Microporous Membranes Via Upper Critical Temperature Phase Separation," *Materials Science of Synthetic Membranes*, ed., D.R. Lloyd, American Chemical Society, Washington, D.C. (1985), p. 229-244.

Taylor, "Two Layer Slot Coating: Study of Die Geometry and Interfacial Region," Thesis, McMaster University, Jul. 1997.

Taylor et al., "Visualization and Flow Simulation of a Two-Layer Slot Coater," *Chemical Engineering Science* 54:909-918 (1999).

Weigel et al., "Bikomponentenmembranen II. Herstellung von Bikomponentenmembranen unter Einsatz einer Bikomponentenbreitschlitzdüse," *Acta Polymerica* 40:734-740 (1989).

Weigel et al., "Bikomponentenmembranen III. Diffusion und Strukturbildung bei der Koagulation von Polymerlösungen unetr Einsatz einer Bikomponentenbreitschlitzdüse," *Acta Polymerica* 41:124-131 (1990).

Weigel et al., "Bicomponent membranes. IV. Influence of Membrane Formation Principles on the Structure of the Active Layer of Membranes," *Acta Polymerica* 42:366-371 (1991).

Schenkel, "Plastics Extrusion Technology and Theory," Iliffe Books Ltd., London, published by American Elsevier Publishing Company Inc., New York, pp. 336-337 (1967).

\* cited by examiner

PROCESS OF FORMING MULTILAYERED STRUCTURES

This is a continuation of U.S. patent application Ser. No. 10/275,210, which claims benefit of PCT Patent Application Ser. No. PCT/US01/16817, filed May 22, 2001, and U.S. Provisional Patent Application Ser. No. 60/206,623, filed May 24, 2000.

FIELD OF THE INVENTION

This invention relates to a process for forming multilayer porous membranes having improved layer to layer junction structure, and to the membrane so formed. More particularly, this invention relates to a process for making a multilayer porous membrane from a multilayered liquid sheet produced by a co-casting method, and to the membranes so formed.

BACKGROUND OF THE INVENTION

Polymeric microporous membranes have been prepared previously. Most of the commercialized membranes are symmetric in nature. Symmetric membranes have an approximately uniform pore size distribution throughout the membrane. The production of skinless symmetric microporous membranes are described, for example in U.S. Pat. No. 4,203,848 for polyvinylidene fluoride (PDVF) and in U.S. Pat. No. 4,340,479 for polyamide membranes. These preparations are generally described to consist of the following steps: a) preparation of a specific and well controlled preparation of a polymer solution, b) casting the polymer solution in the form of a thin film onto a temporary substrate, c) coagulating the resulting film of the polymer solution in a nonsolvent and d) removing the temporary substrate and e) drying the microporous membrane.

Membrane manufacturers produce membranes that are robust and reliable for sterile filtration using such methods. Such membranes are primarily single layer symmetric membranes, although other structures have been investigated and used for such membranes.

Another single layered structure is the asymmetric membrane, where the pore size of the membrane varies as a function of location within the thickness of the membrane. The most common asymmetric membrane has a gradient structure, in which pore size increases from one surface to the other. Asymmetric membranes are more prone to damage, since their retention characteristic is concentrated in a thick, dense surface region or skin see U.S. Pat. No. 4,629,563. It has been found, however, that increased productivity results from having the feed stream to be filtered contact the larger pore surface, which acts to prefilter the stream and reduce membrane plugging, see U.S. Pat. No. 4,261,834. Additionally, others have been successful in making asymmetric non-skinned or skinless microporous membranes. One such product is sold as Express™ membranes made by Millipore Corporation of Bedford, Mass.

Practitioners in the art of making microporous membranes, particularly asymmetric membranes, have found that membranes which contain large (relative to membrane pore size) hollow caverous structures have inferior properties compared to membranes made without such hollow structures. These hollow structures are sometimes called "macrovoids", although other terms are used in the art. Practitioners striving for membranes of very high retention efficiency prefer to make membranes without such hollow structures.

Perhaps the most direct variation of the single layer structure is a multilayered unbonded laminate. While laminates can be made from layers of the same or different membranes, they have drawbacks. Each layer has to be made in a separate manufacturing process, increasing cost and reducing manufacturing efficiency. It is difficult to manufacture and handle very thin membranes, less than say 20 microns, because they deform and wrinkle easily. This adds the inefficiency of producing a final product with thin layers. Unbonded laminates can also come apart during fabrication into a final filter device, such as a pleated filter, which will cause flow and concentration non-uniformities.

Other methods of forming multilayered microporous membrane structures are known. U.S. Pat. No. 5,228,994 describes a method for coating a microporous substrate with a second microporous layer thereby forming a two layer composite microporous membrane. This process requires two separate membrane forming steps and is restricted by the viscosities of the polymer solutions that can be used in the process to prevent penetration of casting solution into the pores of the substrate.

Attempts have been made to produce multilayer microfiltration membranes. U.S. Pat. No. 4,770,777, describes a process with the following steps: casting a first membrane layer, b) embedding a fabric support into this first membrane and c) casting a second membrane layer on top of the embedded fabric to form a kind of membrane/fabric/membrane sandwich. The presence of a nonwoven could however lead to defects and imperfections, which are undesirable. U.S. Pat. No. 5,500,167 describes a method of preparing a supported microporous filtration membrane. This method consists of applying a first casting solution onto the first side of a porous nonwoven support material to form a first casting solution layer having a substantially smooth surface, then applying a second casting solution onto the substantially smooth surface of the first casting solution layer to form a second casting solution layer prior to the complete formation of a microporous membrane from the first casting layer, and forming a continuous microporous membrane having first and second zones from the first and second casting solutions such that the first side of the support material is integral with the first zone while not protruding into the second zone, and the first zone has a pore size at least about 50% greater than the pore size of the second zone. This product requires a nonwoven support which could lead to defects or imperfections. In U.S. Pat. No. 5,620,790, a membrane is described made by pouring out a first layer on a support of polymeric material onto a substrate and subsequently pouring out one or more further layers of a solution of polymeric material onto the first layer prior to the occurrence of turbidity in each immediately successive preceding layer, the viscosity of each immediately successive layer of a solution of polymeric material having been the same or less than that of the preceding layer. In U.S. Pat. No. 5,620,790, improved throughput is achieved by making fairly thick membranes which will tend to lower overall permeability.

In all three multilayer casting processes described above, however, a significant interval of time or a setting time between the separate coating steps is essential to the process of forming a multilayer membrane. Such sequential casting can cause the formation of a dense layer at the interface between the two layers in the membrane. This makes these methods undesirable in terms of robustness, since variability of the process during this setting time can lead to non-uniformity. While U.S. Pat. No. 5,620,790 discusses that a minimum setting time of several seconds to 2 minutes are advantageous, the prior art processes cannot reduce the interval between coating applications to essentially no time.

In the present invention, the inventor has surprisingly found that at essentially no time between the coating applications, one forms membranes in which there is a continuous change of membrane structure without a discontinuity through the junction between layers.

Furthermore, in the prior art a well-defined demarcation line is found between the two layers. This demarcation line signifies a drastic change in pore size going from a more open to a more tight structure. It can also signify a region of dense, skin-like structure. Either of these structural regions can lead to a lower permeability and an undesirably fast accumulation of particles at the interface and consequently a drastic flux decline. A more subtle change in pore size between two adjacent would reduce this effect and be beneficial for the retentive behavior of the overall structure of the membrane.

In a brief study as part of the Doctoral thesis of the inventor ("*Membrane Formation by Phase Separation in Multicomponent Polymer Systems*"; University of Twente, NL 1998), hereby included as reference, the effect of a second polymer solution layer covering a first polymer solution layer on the demixing or phase separation of each layer was studied. The purpose of this work was to qualitatively determine if a dense (non-porous) separation layer of reduced thickness could be formed by covering a first polymer solution layer with a second polymer solution layer of a different composition and then forming a membrane by immersion methods in the usual way. The polymer content and solvents were chosen to produce dense surface layer membranes, such as pervaporation membranes. The author compared the modes of phase separation for single and two layer membranes by comparing overall membrane structure with scanning electron microscopy photomicrographs. No membrane properties were measured. It was inferred from the photomicrographs that the dense layer thickness could be varied by this procedure.

The inventor found in the development of the present invention that in order to produce microporous membranes of improved properties, it was critical that the structure of the interfacial region between the layers be controlled. Initial work showed that if a dense region formed at the interface, membrane properties suffered. In particular, membrane permeability was reduced and filtration throughput was low for membranes having a distinct dense region at the interface. There was no motivation in the prior art to optimize this region in conjunction with overall membrane structure.

Moreover, it was found during the development of the present invention that throughput is controlled by the structure of the layer with the larger average pore size in combination with the structure of the interface. Whereas the prior art had concentrated on optimizing the structure of the retentive layer, particularly for membranes with a dense retentive layer, (e.g., reverse osmosis and pervaporation), in the present invention, the inventor was faced with the problem of controlling the retentive properties of all layers and the interfacial regions as well.

U.S. Pat. No. 5,620,790 teaches that for sequentially cast membranes, a viscosity restraint is imposed in that the viscosity of the lower layer should be higher than the viscosity of the upper layers.

Accordingly, it would be desirable to provide a process for forming a integral multilayer microporous membrane that is macrovoid free. In addition, it would be desirable to provide a simplified process wherein the layers are cast simultaneously in order to form in a controlled manner regions of intermediate pore size at the junctions of adjoining layers.

BRIEF DESCRIPTION OF THE INVENTION

In accordance with the present invention, a process is provided for producing multilayer microporous membranes including the steps of a) preparing a plurality of lacquers, b) co-casting these lacquers to form a multilayer liquid sheet and c) immersion of the co-cast multilayer liquid sheet into a liquid bath/coagulation bath to effect phase separation in a continuously layer sequence. An optional extraction step after coagulation can be provided to extract all the residual solvent within the microporous structure. The microporous membrane then is dried under restraint.

The multilayer microporous membrane of this invention is free of a dense interfacial layer between layers. In addition, adjacent layers are inseparable and integral with one another and are free of macrovoids. Each of the layers of the multilayer membrane of this invention can be a retentive layer in that thee retain a retentate component while permitting through passage of a filtrate.

DESCRIPTION OF SPECIFIC EMBODIMENTS

The present invention provides for a method of producing an integral multilayered porous membrane by co-casting a plurality of polymer solutions onto a support to form a multilayered liquid sheet and immersing the sheet into a liquid coagulation bath to effect phase separation and form a porous membrane. The support can be a temporary support which is removed subsequent to membrane formation. Alternatively, it be incorporated into the final structure if desired After formation, the porous membrane is washed free of solvent and other soluble materials. It can then be further extracted to reduce fugitive materials to a low level and then be dried.

In the present invention, "co-casting" means that the individual layers are cast essentially simultaneously with each other with substantially no time interval between one cast layer and the next cast layer. Co-casting is an important aspect of the invention because it allows for formation of controlled pore size regions at the junctions of layers. In the prior art, a well-defined demarcation line is formed between the sequentially cast layers. A drastic change in pore size going from a more open to a more tight structure can lead to undesirable fast accumulation of particles at the interface and/or the formation of a skin layer at the demarcation point and consequently a drastic flux decline. Possibly due to partial mixing of adjacent co-cast lacquers or due to high shear forces at the interface between two adjacent co-cast lacquers, a sharp interface can be replaced by a more subtle change in pore size between two adjacent layers. Such an interfacial zone is beneficial for the retentive behavior of the overall structure of the membrane. At the same time, it allows the formation of microporous structure with no discernable demarcation line in the structure.

Likewise, the term "integra" means a structure, that although formed of multiple layers and often different polymeric materials, that is bonded together so that behaves it as one structure and does not delaminate or separate in normal use.

Figure 1:
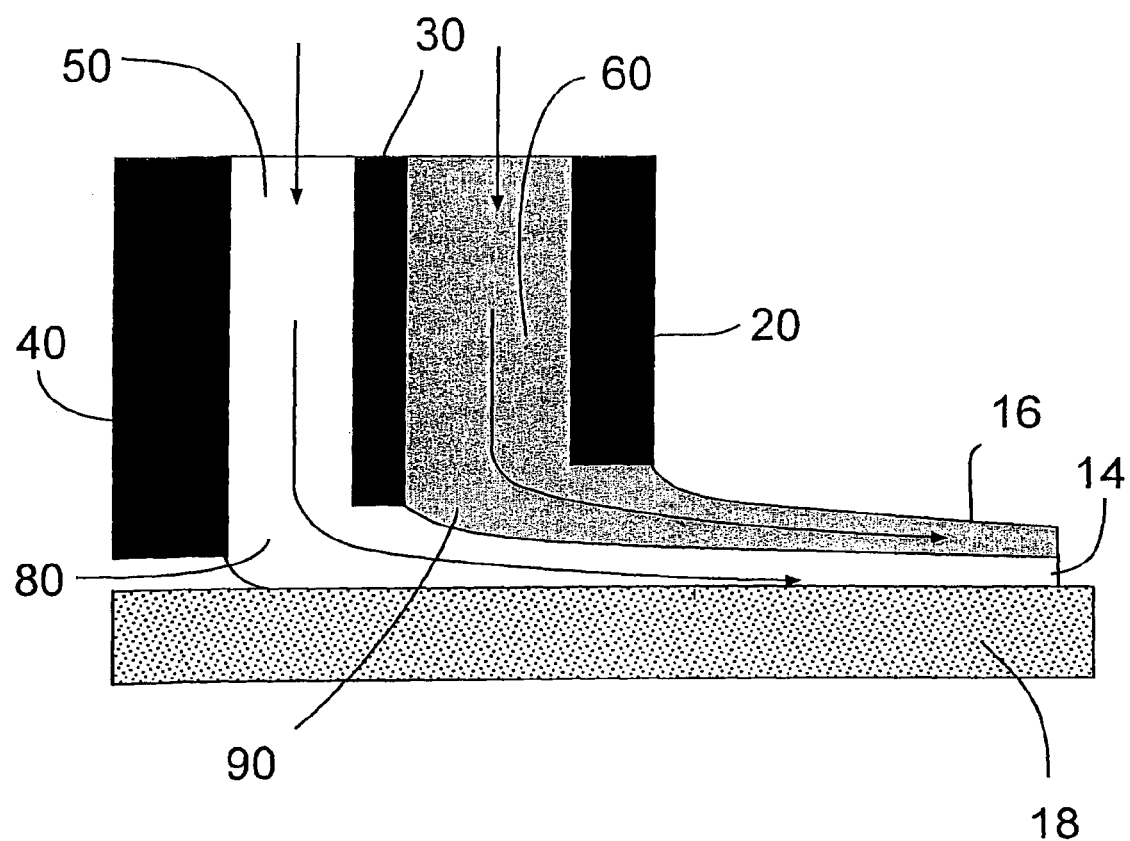
FIG. 1 is a side view of an apparatus useful in effecting the process of this invention.

FIG. 1 illustrates a multiple layer forming apparatus 10 for casting multilayered membranes. As shown, the apparatus is designed to produce a two-layered liquid film and has two chambers 50 and 60 containing the solutions 14 and 16, one for each layer, to be cast. If desired, additional chambers may be added to form additional co-cast layers. The apparatus comprises a front wall 20 and a back wall 40 with a separating wall 30 between the front and back walls. The separating wall defines the volumes of the two chambers. Two side walls, not shown, complete the apparatus. In operation, the apparatus is fastened onto a typical membrane casting machine, and a support web 18 is moved or passed under the stationary apparatus and the two solutions are dispensed through gaps or outlets 80 and 90. The thickness of the two layers is controlled by the distance (gap) set between the moving web and the outlet, illustrated by gap settings 80 and 90. The final liquid layer thickness is a function of gap distance, solution viscosities, and web speed. The back wall of the apparatus usually is held a small distance above the support to prevent wrinkling or marring the support. Back wall gap, support speed and solution viscosity are adjusted in practice to prevent solution from leaking out through the back wall gap. The apparatus can be fitted with heating or cooling means for each chamber separately, or for the apparatus as a whole, if necessitated by the solution characteristics, or to further control final membrane properties.

As illustrated the process relies on gravity driven flow. However, the chambers can be covered and sealed if needed, and fitted with an inlet for a pressurized fluid, usually an inert gas such as dry nitrogen or argon. The chambers can then be pressurized separately as required by the solution viscosity and process requirements. In another embodiment, the solutions are pumped.

The temporary support 18, such as a non-porous plastic or metal sheet, with the co-cast multilayer liquid sheet is then immersed in a coagulant bath (not shown) as is well-known in the art for a period to effect phase separation of the polymer solutions in a continuously layered sequence and form an integral multilayer microporous polymeric membrane. After formation, the membrane is usually washed to remove residual solvent and other low molecular weight components of the-casting solution and wound onto a core. The temporary support 18 is wound onto a separate wind up drum (not shown).

If the support is not temporary but is intended to be a permanent portion of the finished product, one may use a nonporous film for, uses such as diagnostic strips or a porous, nonwoven fabric such as TYVEK® sheets, a stretched porous PTFE sheet such as is available from W.L. Gore & Associates of Timonium, Md., or a microporous membrane made of cellulosic material or plastic or other such materials commonly used in the art as support layers for these types of membranes.

In a continuously layered sequence of coagulation, coagulation occurs from the liquid film surface that first contacts the coagulation bath and then through the subsequent layers of the multilayered liquid sheet. Each layer dilutes and changes the coagulant as the coagulant diffuses through the layers. Such changes to the nature of the coagulant affect the membrane formation of each layer and of the final multilayer membrane. Layer thickness, composition and location of each layer relative to the other layers will affect membrane structure and properties. This is obviously different from a single layer membrane and from membranes made from laminates of single layers.

The process is adaptable to complementary membrane formation steps. For example, in our co-pending application, 60/206,622 filed May 24, 2000, a process of producing symmetric and/or asymmetric membranes is disclosed in which a single layer liquid film of a membrane forming composition containing a semi-crystalline polymer is briefly heated before phase separation. Such heating controls the final membrane pore size and cross-sectional structure. In an embodiment of the present invention, one or several layers would be formed from such compositions utilizing the thermal process of the co-pending application to give additional methods of forming desired pore size and membrane architecture.

In another embodiment of the present invention, the teachings of U.S. Pat. No. 5,444,097 are used in which a membrane is made from a polymeric solution exhibiting a lower critical solution temperature (LCST). Heating the solution above the LCST causes phase separation. This step is incorporated in the process of the present invention after the multilayered liquid film is formed to further vary and control the structures of the resulting membranes. One or several of the solutions of the present invention would be LCST solution. Similarly, solutions with an upper critical solution temperature (UCST) which phase separate when cooled below the UCST, would be formed into a multilayered liquid film in a heated state and cooled to obtain phase separation. In both the LCST and UCST embodiments, further phase separation can be provided by immersion into a coagulant, as described previously.

Air casting, sometimes called vapor induced phase separation, in which phase separation occurs during an evaporation step, can be adapted to this process by forming a multilayered liquid layer from solutions containing an evaporative solvent and less evaporative non-solvents, and subjecting the liquid film to an evaporative environment, such as a heated air stream, optionally containing water vapor.

The process of this invention provides for separate control of the individual regions of the membrane, a region being comprised of membrane formed by each solution and a possible interfacial region and the controlled pore size regions at the junctions of layers. This process allows a wider range of useful viscosities of the individual layers, a better control of the thickness of the two or more individual layers and avoids possible skinning effects or dense regions at the interface between the two or more layers, usually between 2 and 4 layers. In one embodiment, a nonwoven support can be used to increase mechanical stability, although unsupported composite membranes have sufficient mechanical strength (depending on pore size). This combination therefore allows the formation of better controlled, higher integrity, multilayer microporous membranes with improved fluxes.

The process of this invention also allows for independent casting of very thin layers. Layer thickness depends not only on the casting device geometry but also on flow and viscosity of both lacquers. In the process of this invention, the well-defined demarcation line seen in prior art between the two layers can be significantly reduced or avoided. A drastic change in pore size going from a more open to a more tight structure can lead to undesirable fast accumulation of particles at the interface and consequently a drastic flux decline. Possibly due to partial mixing of adjacent co-cast lacquers or due to high shear forces at the interface between two adjacent co-cast lacquers, a sharp interface can be replaced by a more subtle change in pore size between two adjacent layers. Such an interfacial zone is beneficial for the retentive behavior of the overall structure of the membrane. At the same time, it allows the formation of microporous structure with no discernable demarcation line in the structure. In addition, in some cases, shrinkage of the formed membranes can be prevented in a co-cast mode while a considerable shrinkage occurs in single films. This also allows the use of membrane structures, which would otherwise be difficult or impossible to make from a particular lacquer, especially for membranes with a very small pore size, shrinkage is found to be substantial as single films.

As discussed above, this process can be used with any of the known methods for forming microporous membranes such as liquid casting or air casting. Additionally, the polymers and solvents/nonsolvents used for making such microporous membranes can also be used.

Preferred polymers include but are not limited to PVDF, nylons such as Nylon 66, polyamides, polyimides, polyethersulphones, polysulphones, polyarylsulphones, PVC, PET, polycarbonates, cellulose, regenerated cellulose, cellulose esters such as cellulose acetate or cellulose nitrate, polystyrenes, polyetherimides, acrylic polymers, methacrylic polymers, copolymers of acrylic or methacrylic polymers, or blends of any of the above and the like.

The polymer solutions of the present invention typically consist of at least one polymer and at least one solvent for the polymer or polymers. The solution may contain one or more components that are poor solvents or non-solvents for the polymer or polymers. Such components are sometimes called "porogens" in the art. The solutions are preferably homogeneous. They can optionally contain one or more components, which are non-solvents for the polymer. The polymer solution can either be stable in time (good solvent quality) or be meta-stable in time. This solution also can potentially have a lower critical solution temperature or an upper critical solution temperature. Example components of such solutions are well known in the art, and it is not necessary to exhaustively list all possible variations. Solvents that are used included such examples as dimethyl formamide, N,N-dimethylacetamide, N-methyl pyrrolidone, tetramethylurea, acetone, dimethylsulfoxide. A myriad of porogens have been used in the art, including such examples as formamide, various alcohols and polyhydric compounds, water, various polyethylene glycols, and various salts, such as calcium chloride and lithium chloride.

One can form the layers of the same polymer and solvent, varying the viscosity, additives and treatment (before, during or after formation) or one can different polymers for the different layers. When using different polymers one must select polymers that are compatible with each other. Additionally, the solvents and phase separation materials should be the same if possible or at least compatible so that they do not adversely affect the other layer(s).

The microporous structures of the present invention may have an average pore size of from about 0.01 microns to about 10 microns, preferably from about 0.01 to about 2 microns.

As discussed above, the use of various formulations and processing steps, such as the thermal assisted formation process of 60/206,622 filed May 24, 2000 can create some unique multilayered products. One can form multilayered products with all layers being either symmetrical or asymmetrical, with at least one layer being, symmetrical and the others being asymmetrical, with at least one layer being asymmetrical and the others being symmetrical, with both inversely asymmetrical such that the pores form an hourglass like structure with the smallest pore size being within the depth of the cross section of the structure, etc. Symmetric membranes have a porous structure with a pore size distribution characterized by an average pore size that is substantially the same through the membrane. In asymmetric membranes, the average pore size varies through the membrane, in general, increasing in size from one surface to the other. Other types of asymmetry are known. For example, those in which the pore size goes through a minimum pore size at a position within the thickness of the membrane. Asymmetric membranes tend to have higher fluxes compared to symmetric membranes of the same rated pore size and thickness. This invention allows one to form unique structures to handle specific applications and needs.

Asymmetrical membranes may have a pore size gradient of from about 2:1 to about 1000:1, preferably from about 2:1 to about 100:1. This asymmetry is measured by comparing the average pore size on one major surface of the layer with the average pore size of the other major surface of that layer. In this invention, one can create two or more asymmetrical layers, each having a different or if desired, similar asymmetry.

Additionally, as mentioned above, one vary the thickness of each layer within a wide range and still obtain a self-supporting, integral multilayered structure. Typically, one desires to have the thickness of the membrane structure to be between 50 and 200 microns in thickness as this provides good filtration characteristics and self support. With the present invention one can still achieve the same overall thickness but can control the relative thickness fo one layer to the other to create unique and desirable membrane structures. Typically, one can make one layer as thin as 10 microns and it will result in an integral multilayered structure so long as the remaining structure is a suitable thickness. Thus for example in a 150 micron thick membrane, one can have a first layer that is from about 10 to about 140 microns thick while the other is correspondingly from about 140 microns to about 10 microns in thickness.

Figure 15:
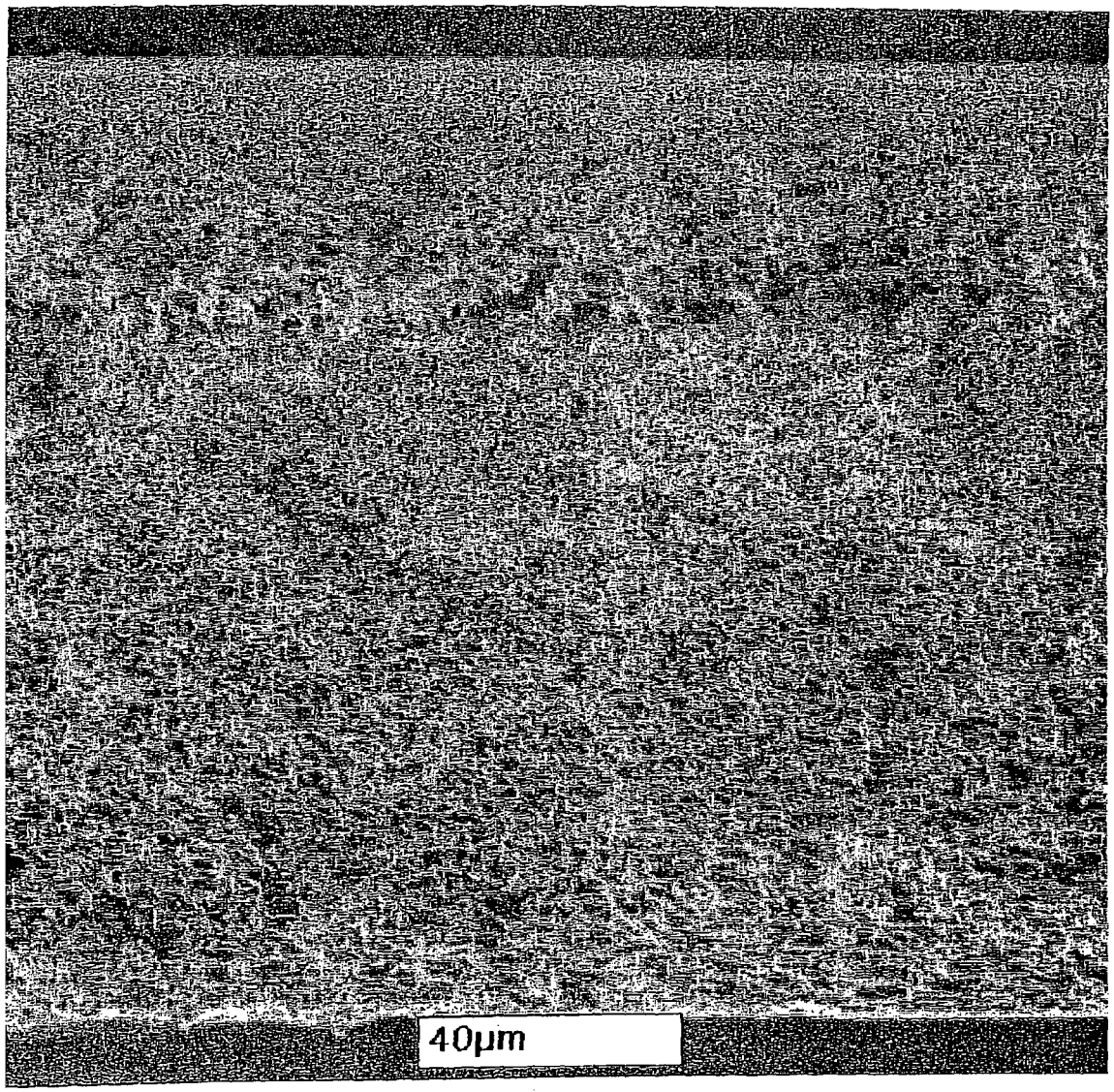
FIG. 15 shows a cross-sectional microphotograph of a multilayered structure of the present invention wherein both layers are asymmetrical.

FIG. 15 shows a cross-sectional microphotograph of a multilayered structure of the present invention wherein both layers are asymmetrical.

Figure 16:
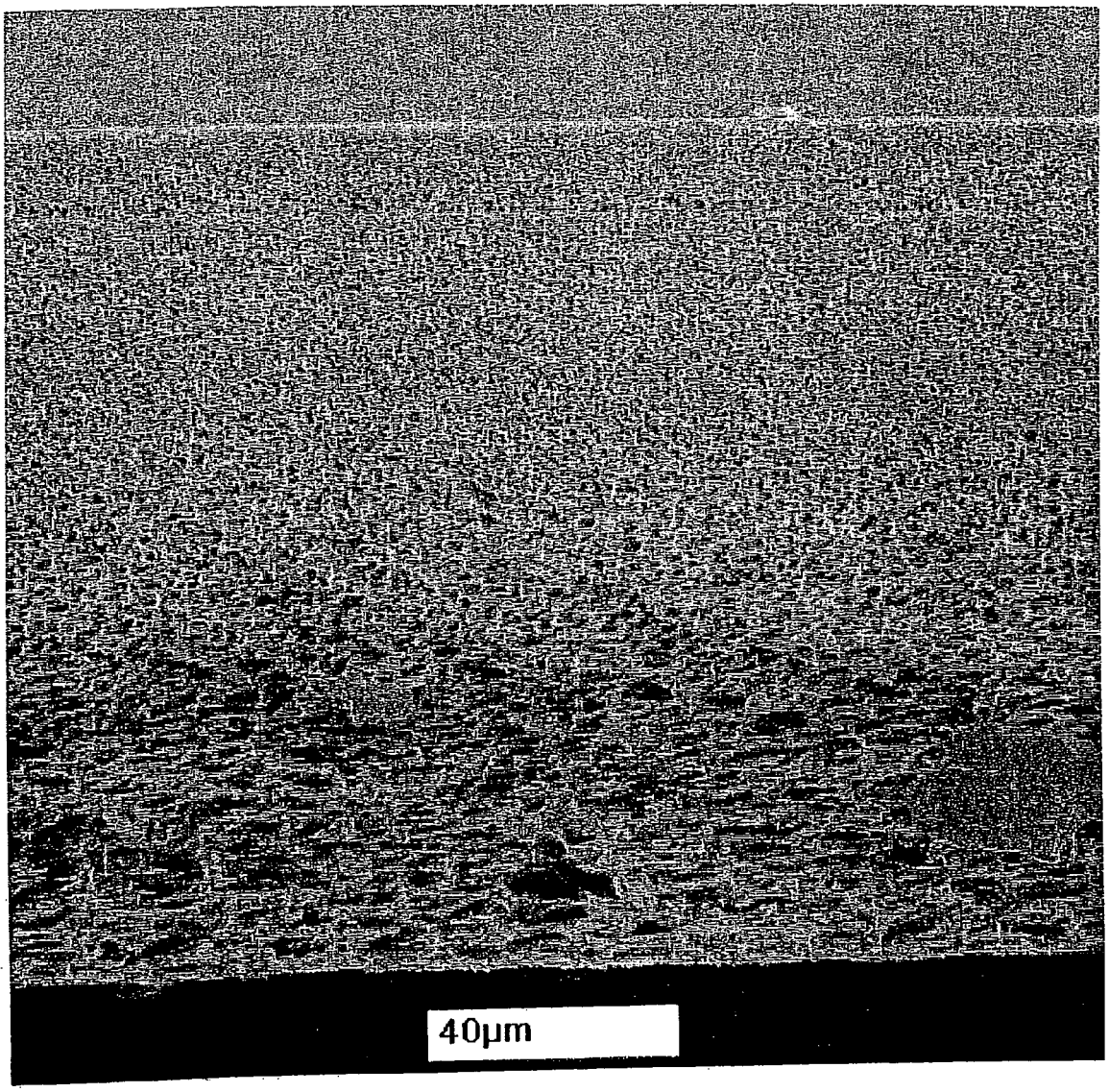
FIG. 16 shows a cross-sectional microphotograph of a multilayered structure of the present invention wherein one layer, in this instance the top layer is symmetrical and the bottom layer is asymmetrical.

FIG. 16 shows a cross-sectional microphotograph of a multilayered structure of the present invention wherein one layer, in this instance the top layer is symmetrical and the bottom layer is asymmetrical.

EXAMPLE I

Solutions were made consisting of 17 to 24 w % polyvinylidenefluoride (PVDF) and 83 to 76% N-methylpyrrolidone (NMP). Each solution was divided into several smaller quantities, which each underwent a different thermal treatment, as shown in Table 1. Each thermal treatment consisted of heating the polymer solution to a predetermined temperature and holding the solution at that temperature for 2 hours. Temperatures ranged from 38 to 50° C. During treatment the solutions were gently agitated using a roller mill. Thereafter the solutions were cooled to room temperature.

Multilayers of two polymer solutions were co-cast using an apparatus such as illustrated in FIG. 1. Lacquer reservoirs 50 and 60 were filled with the two different polymer solutions. By moving the belt relative to the casting apparatus, a multilayer structure was cast without any setting time between the two lacquers. The volumetric flow of the two polymer solutions and the thickness of each layer was controlled by the gap settings 80 and 90 of FIG. 1. The formed multilayer was immersed in a methanol bath having a methanol concentration as high as 95% for approximately two minutes. The bath was kept at room temperature. The flow of the methanol was counter current to the direction of introduction of the multilayer to allow good extraction of NMP from the multilayer membrane. After immersion in the methanol bath for about 2 minutes, the multilayer membrane was removed from the support belt and extracted in a water bath for about 4 minutes. Thereafter the multilayer membrane was taken up onto a core. The membrane was then extracted further in water, immersed in isopropyl alcohol (IPA) and dried under restraint in air. In the Table below the various conditions for co-casting are summarized.

Figure 2:
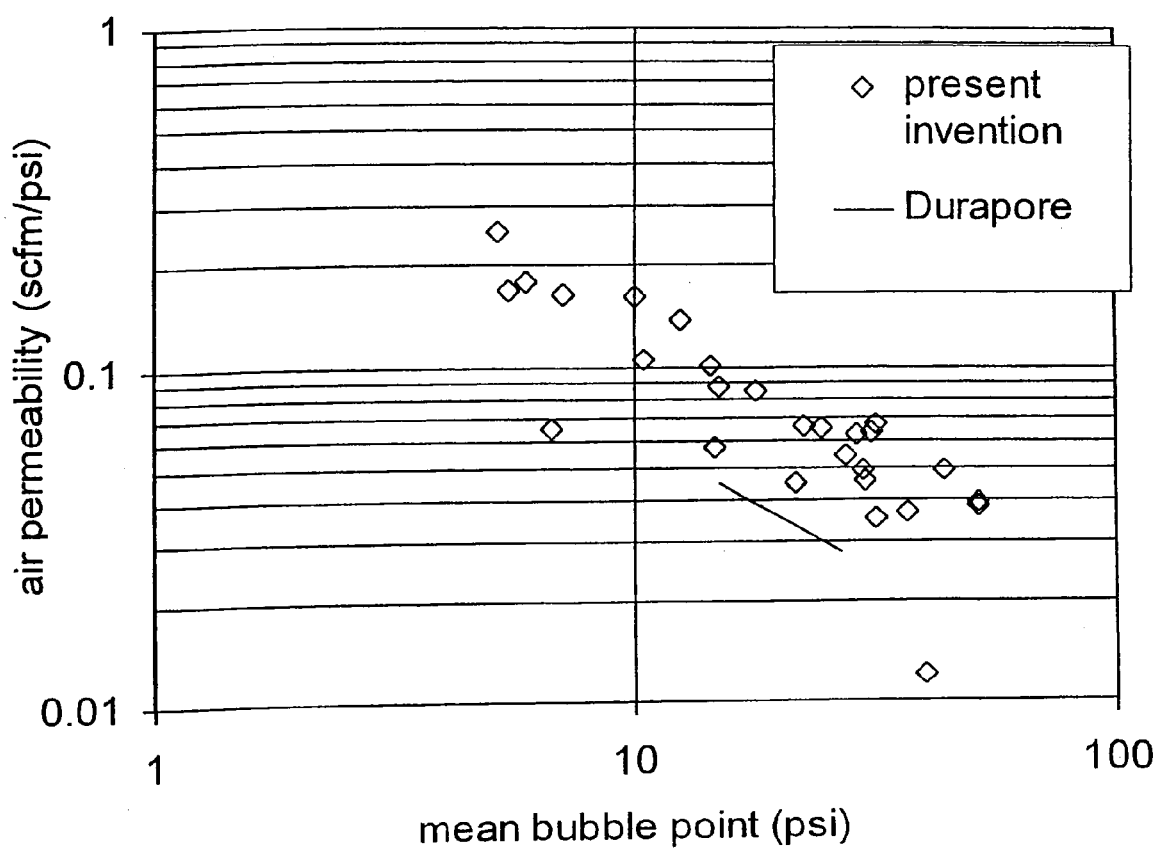
FIG. 2 is a graph of a flux of the membrane of this invention as a function of air membrane bubble point.
Figure 3:
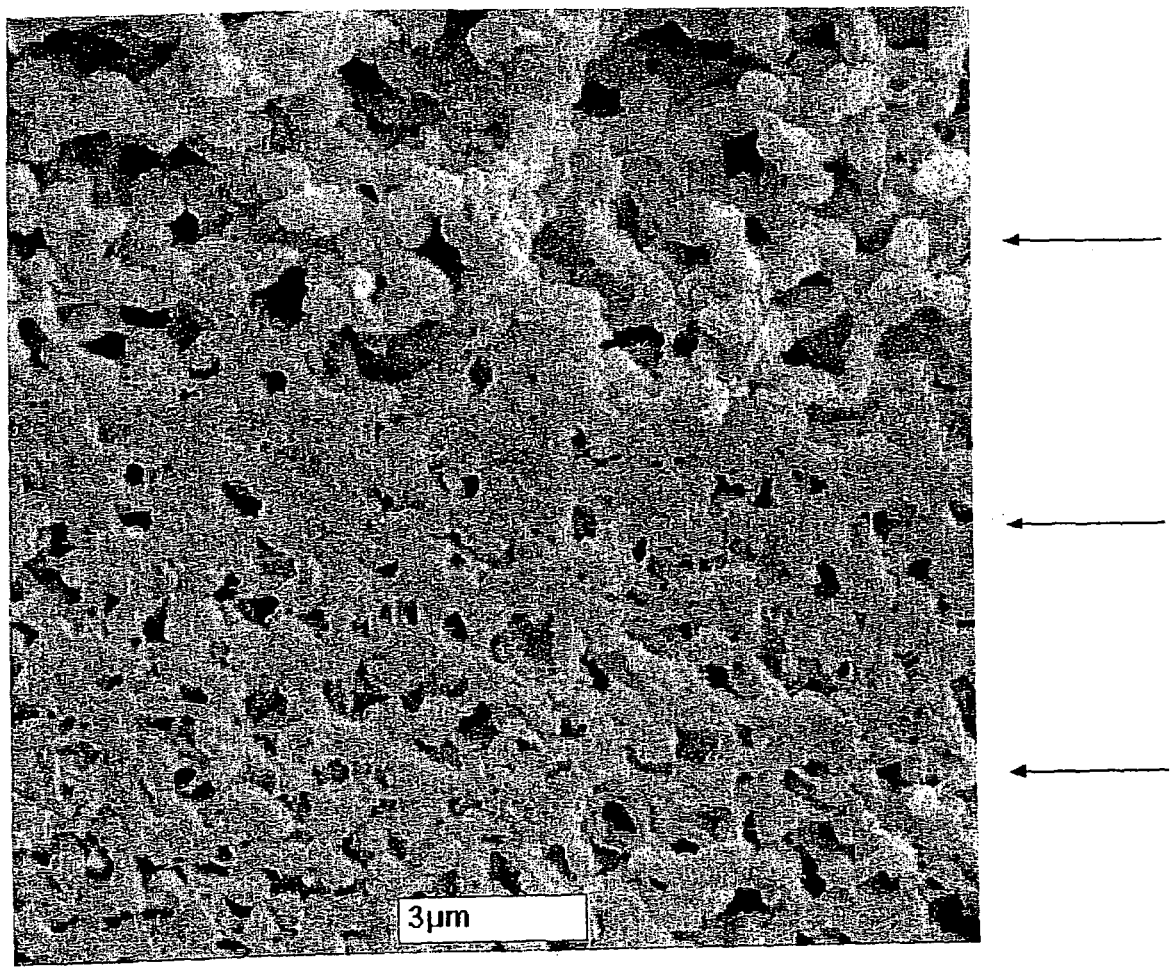
FIG. 3 is a photomicrograph of a multilayer membrane according to prior art.

This rendered membranes which exhibited higher fluxes compared to commercial, symmetric, hydrophobic PVDF membranes (Durapore® membranes, available from Millipore Corporation of Bedford, Mass.) of a similar thickness. In FIG. 2, a flux vs. bubble point map is displayed illustrating the flux improvement of the membranes made by the present invention. FIG. 2 shows that the membranes of the present invention have higher flux properties at similar bubble points.

|  | [PVDF] belt side [w %] | Tmax-belt side [C] | [PVDF] bath side [w %] | Tmax bath side [C] | Top-layer thickness [um] | Mean BP [psi] | Airflow [scfm/psi] | Top-layer Thickness Corrected Air flow [scfm/psi* um] |
|---|---|---|---|---|---|---|---|---|
| 1a | 20 | 32.5 | 20 | 50 | 46.4 | 44 | 0.0489 | 2.2 |
| 1b | 20 | 40 | 20 | 50 | 32.2 | 32 | 0.0674 | 2.2 |
| 1c | 20 | 45 | 20 | 50 |  | 7.1 | 0.1648 |  |
| 1d | 20 | 32.5 | 20 | 60 | 10 | 40 | 0.012 | 0.12 |
| 1e | 20 | 45 | 20 | 60 | 39 | 12 |  |  |
| 1f | 17 | 42.5 | 17 | 20 | 11 |  |  |  |
| 1g | 20 | 42.5 | 20 | 50 | 162 | 10.5 | 0.1059 | 17.3 |
| 1h | 24 | 42.5 | 24 | 20 |  |  |  |  |
| 1i | 17 | 45 | 17 | 20 |  | 32 | 0.0352 |  |
| 1j | 20 | 37.5 | 20 | 50 | 41 | 51.7 | 0.0399 | 1.7 |
| 1k | 20 | 40 | 20 | 50 | 65 | 31.2 | 0.0636 | 4.1 |
| 1l | 20 | 42.5 | 20 | 50 | 58 | 29 | 0.0629 | 3.6 |
| 1m | 17 | 37.5 | 17 | 50 | 80 | 24.5 | 0.0659 | 5.2 |
| 1n | 24 | 42.5 | 24 | 50 | 38 |  |  |  |
| 1o | 17 | 37.5 | 17 | 50 | 73 | 6.8 | 0.0659 | 4.8 |
| 1p | 17 | 37.5 | 17 | 50 | 69 |  |  |  |
| 1q | 24 | 37.5 | 24 | 50 | 50 | 5.2 | 0.2535 | 12.6 |
| 1r | 24 | 45 | 24 | 50 | 90 |  |  |  |
| 1s | 20 | 37.5 | 24 | 50 |  | 21.8 | 0.045 |  |
| 1t | 20 | 42.5 | 24 | 50 | 57 | 30.4 | 0.0459 | 3.2 |
| 1u | 20 | 40 | 24 | 50 | 68 | 27.5 | 0.0542 | 3.6 |
| 1v | 17 | 37.5 | 24 | 50 | 60 | 14.7 | 0.0573 | 3.4 |
| 1w | 17 | 37.5 | 20 | 50 | 27 | 22.6 | 0.663 | 1.7 |
| 1x | 24 | 37.5 | 20 | 50 | 151 | 18 | 0.0849 | 12.8 |
| 1y | 20 | 40 | 17 | 50 |  | 14.5 | 0.1012 |  |
| 1z | 17 | 37.5 | 20 | 50 | 45 | 52 | 0.0386 | 1.7 |
| 1aa | 17 | 37.5 | 20 | 50 | 45 | 37 | 0.0371 | 1.6 |
| 1ab | 20 | 40 | 20 | 50 |  |  |  |  |
| 1ac | 20 | 40 | 20 | 50 |  |  |  |  |
| 1ad | 20 | 42.5 | 20 | 50 | 59 | 15 | 0.0875 | 5.1 |
| 1ae | 20 | 42.5 | 20 | 50 | 38 | 12.5 | 0.139 | 5.3 |
| 1af | 20 | 45 | 20 | 50 | 47 | 6 | 0.18 | 8.5 |
| 1ag | 20 | 45 | 20 | 50 | 52 | 5.5 | 0.17 | 8.84 |

-continued

| | [PVDF] belt side [w %] | Tmax- belt side [C] | [PVDF] bath side [w %] | Tmax bath side [C] | Top-layer thickness [um] | Mean BP [psi] | Airflow [scfm/psi] | Top-layer Thickness Corrected Air flow [scfm/ psi* um] |
|---|---|---|---|---|---|---|---|---|
| 1ah | 20 | 40 | 20 | 50 | 29.8 | 30 | 0.0494 | 4.8 |
| 1ai | 20 | 40 | 20 | 50 | | 10 | 0.1608 | |
| Reference: hydrophobic Durapore ® membrane identified by pore size rating | | | | | | | | |
| 0.45 | | | | | | 15 | 0.045 | 5.5 |
| 0.22 | | | | | | 27 | 0.028 | 3.5 |

EXAMPLE II

In a comparative test of drying formed and washed membranes, it was demonstrated that multilayer membranes have the potential to shrink less as compared to a symmetric membrane cast from a single polymer solution.

In this experiment a PVDF solution was made from 16 w % Solef 1015 (Solvay, Belgium) in NMP and a solution of Kynar 741 (Elf Atochem, USA) in NMP. The Solef solution was cast as a single layer and as a co-cast film with the Kynar solution. Both films were immersed in a methanol bath under exactly the same conditions of casting speed (2 minutes immersion), temperature (room temperature) of the coagulation and lacquer. After immersion, the membranes were extracted in water and dried on an impingement dryer under the same reduced pressure, the same drying time and the same temperature. This drying occurred under the same web speed, which set the unidirectional tension on the membrane. The composite membrane did not shrink at all, while the single film cast from the Solef solution lead to a width reduction to 65% of its original width. Reduction of membrane shrinkage will provide for improved yields in membrane production, and will allow for more efficient processing of the produced membranes.

EXAMPLE III

Figure 4:
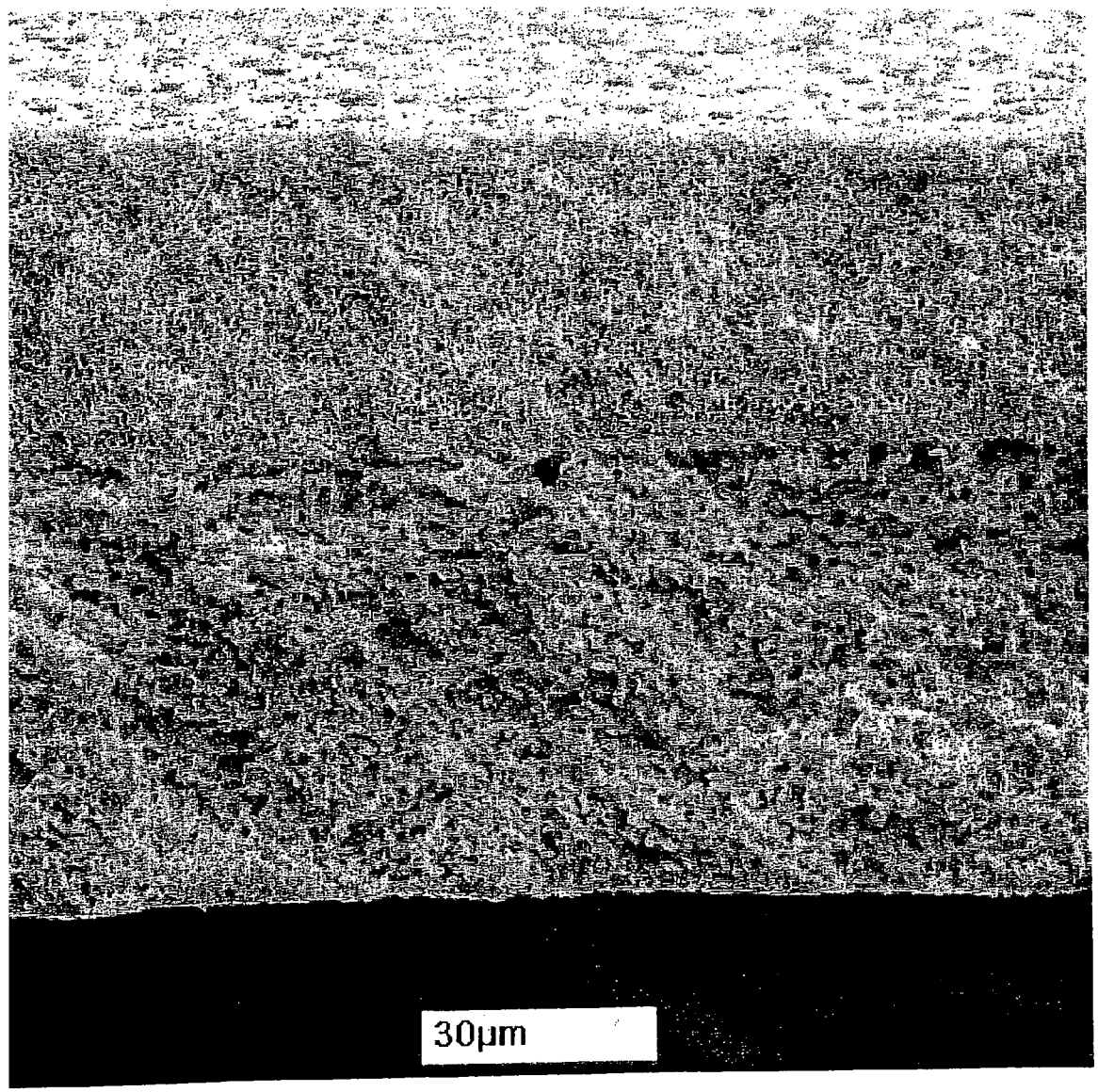
FIG. 4 is a photomicrograph of an asymmetric microporous membrane of the prior art.

In this experiment, a membrane made with a short "setting time" is compared to a membrane made by the present invention. FIG. 4 shows a dense interface between the two polymer solutions. This membrane was made by sequentially casting a second polymer solution onto a first film of PVDF lacquer. In all of the experiments where lacquers were simultaneously cast, no such interface was observed.

Two polymer solutions are made using 20% PVDF and 80% NMP. A multilayer film was produced by casting a first layer of the PVDF solution on a glass plate. The first layer was exposed to the atmosphere before a second layer was cast on the first layer. Atmospheric exposure was accomplished by having a short space, approximately two centimeters between sequential casting steps. The formed multilayer was immersed into methanol until a membrane was completely formed and then extracted in water. The membrane was dried under restraint in air.

The membrane was fractured in nitrogen and a scanning electron microscope image was taken of the cross-section. This image is given in FIG. 4. A distinct dense region is clearly apparent at the interface of the adjoining layers.

Figure 5:
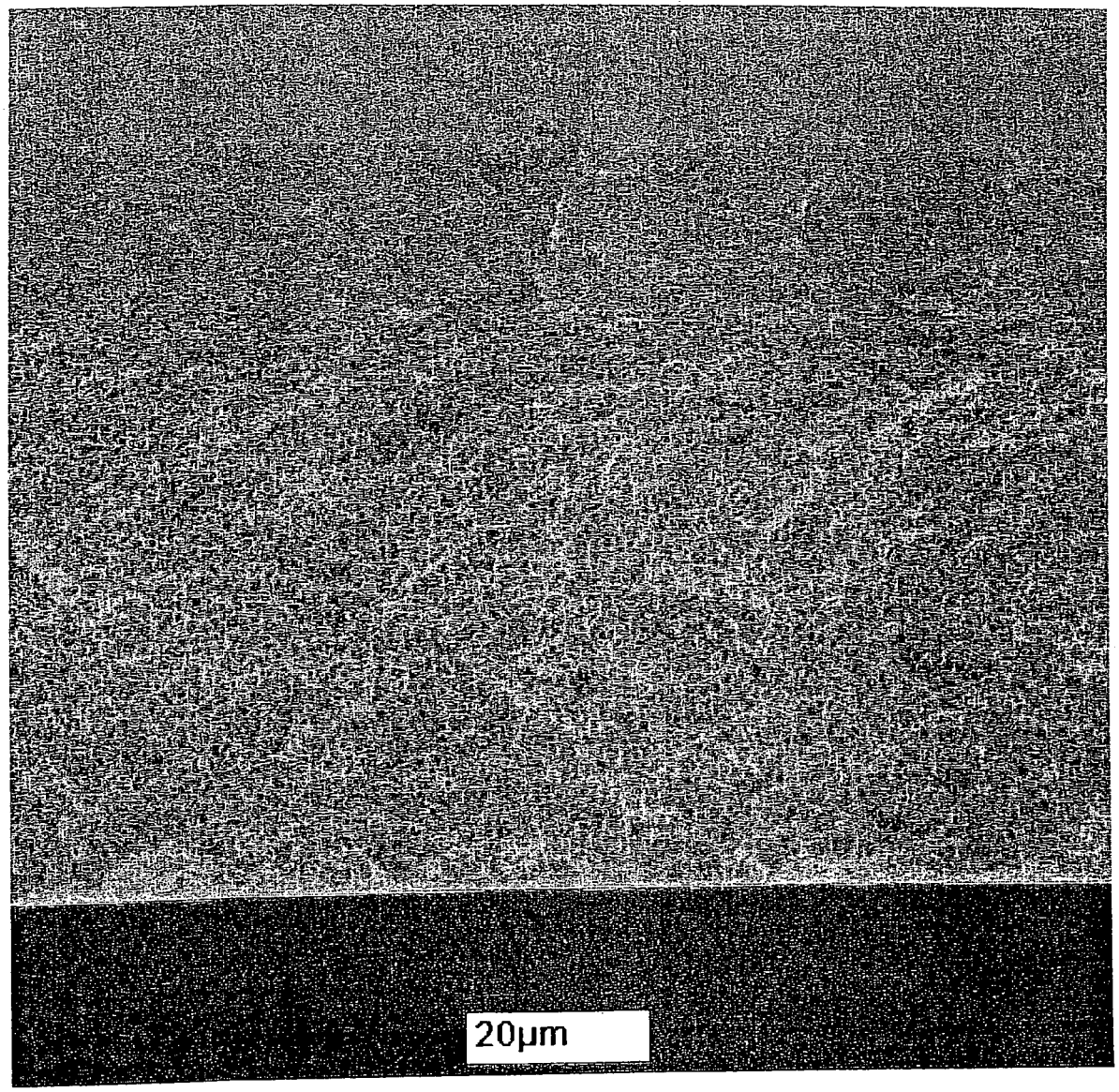
FIG. 5 is a photomicrograph of an asymmetric membrane of this invention.

FIG. 5 shows a typical cross-section of a membrane of the present invention with completely different pore sizes in both layers. This membrane was prepared by simultaneously cocasting of two solutions having the same composition (20 w % Kynar 741) and a similar viscosity but a different thermal history. Two regions can be seen, but there is no dense interface.

EXAMPLE IV

In this example, a cocast multilayer membrane is produced by casting a solution of higher viscosity for the top layer on a solution of lower viscosity. Using a polymer concentration of 24 w % PVDF for the upper layer solution and a polymer concentration of 20 w % PVDF for the lower solution, a structure was formed which has a very small pore size at the top part, a larger pore size at the other surface and a zone in the membrane where pore size changes gradually. (See FIG. 6). No interface is discernable.

Figure 6:
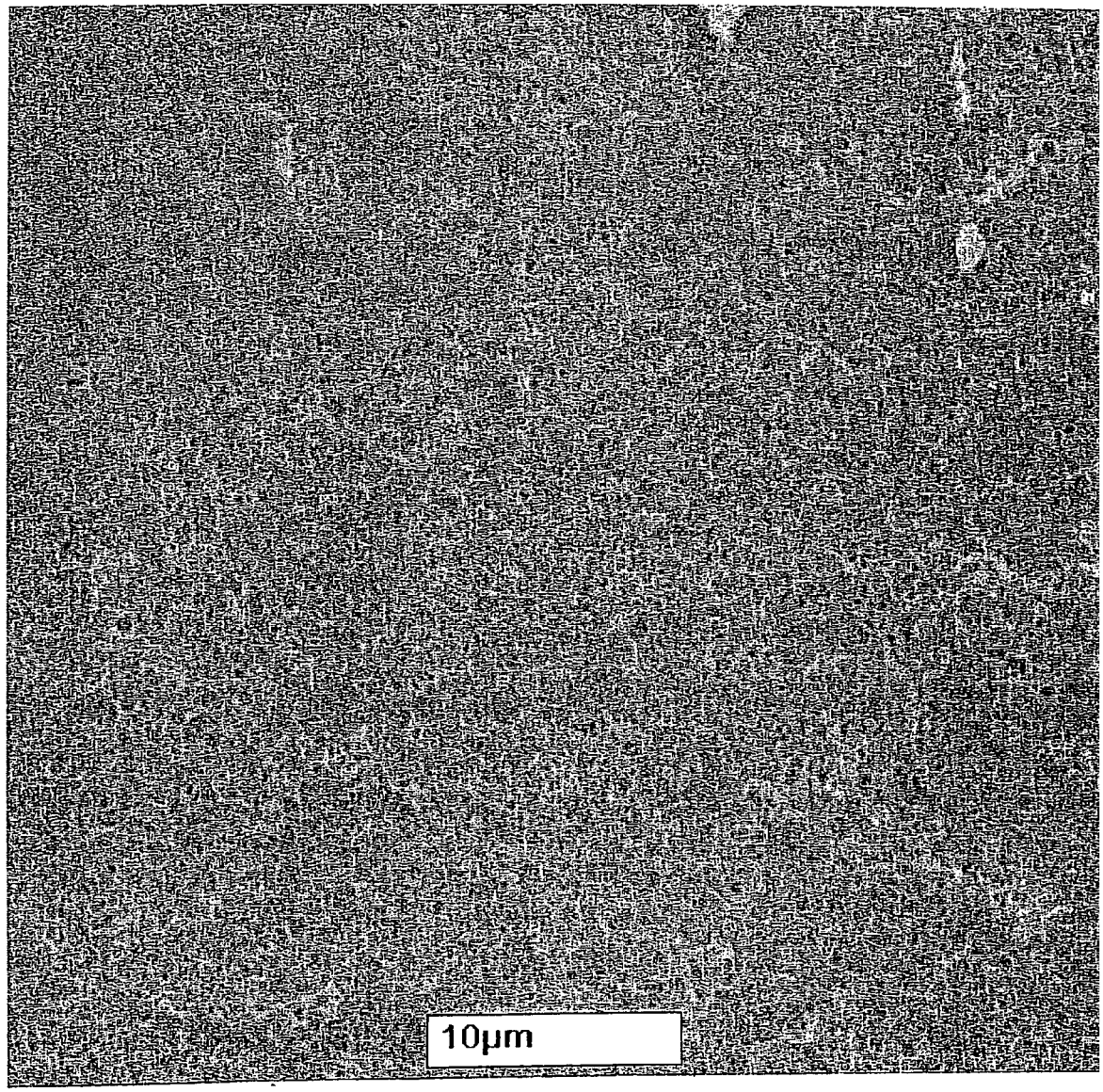
FIG. 6 is a photomicrograph of the bottom surface of the membrane of FIG. 5.
Figure 7:
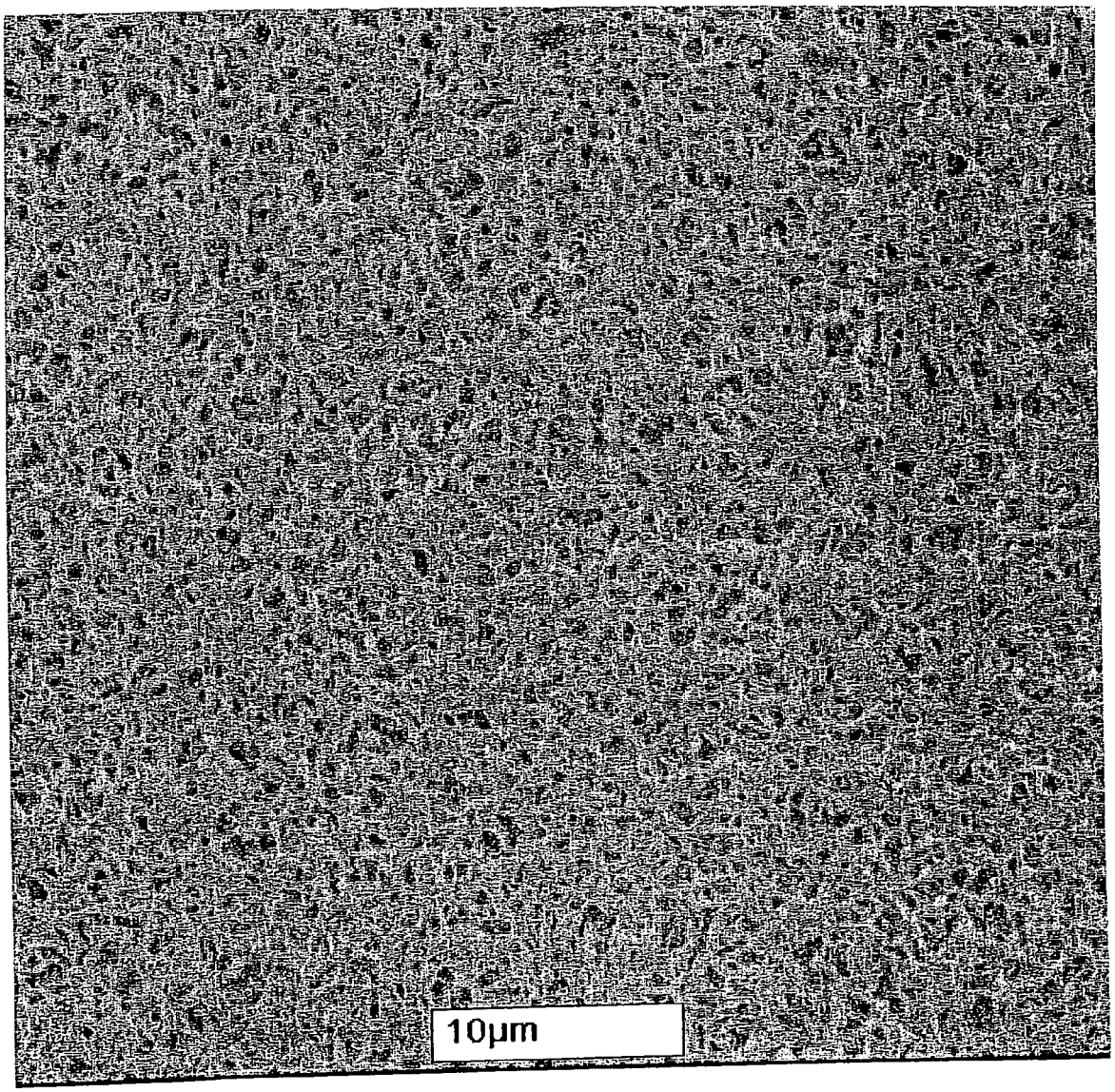
FIG. 7 is a photomicrograph of the top surface of the membrane of FIG. 5.
Figure 8:
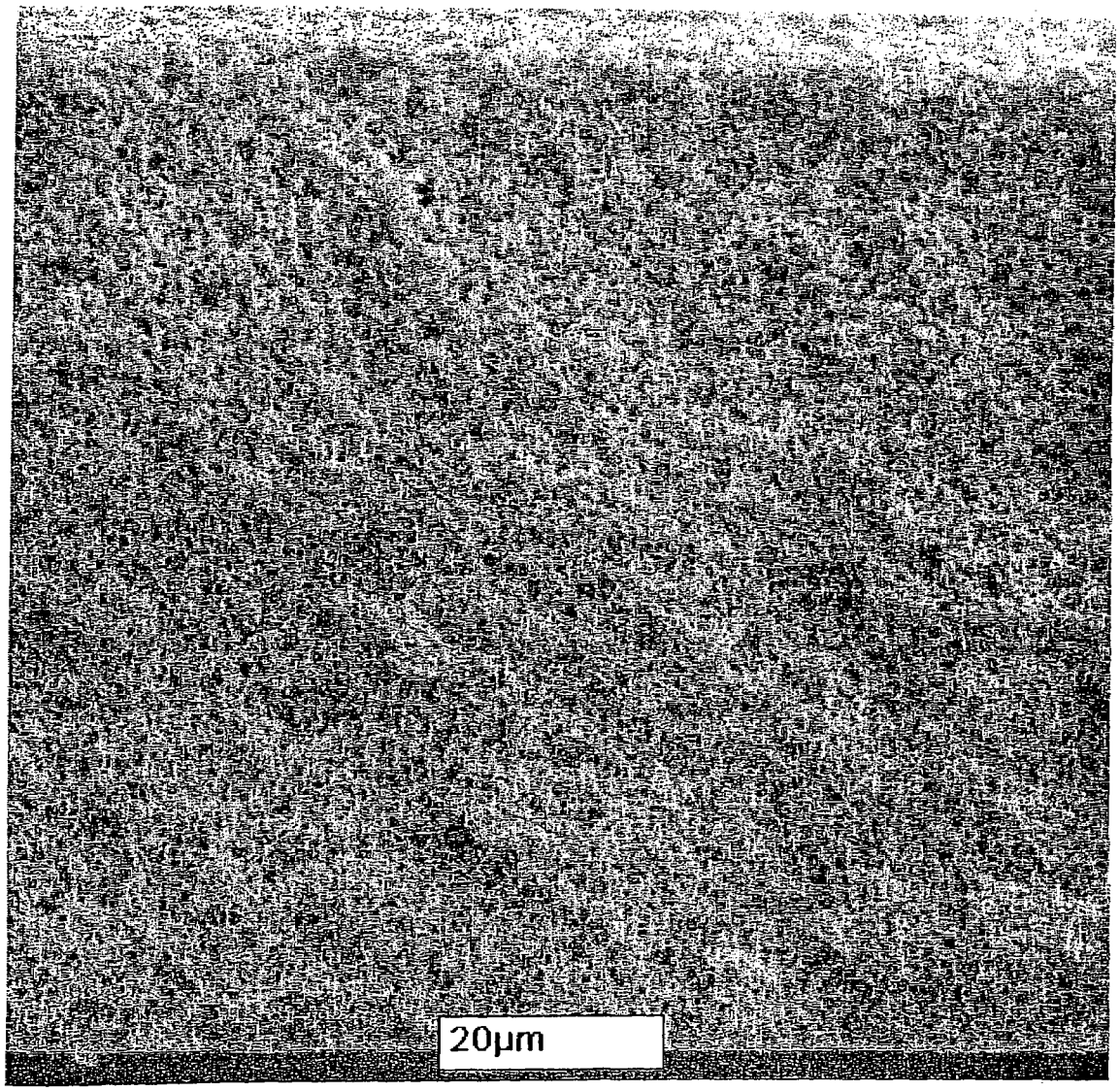
FIG. 8 is a photomicrograph of a cross-section of a membrane of this invention.

A 24% and a 20 w % PVDF solution were made in NMP. Viscosities of a 24 w % and a 20 w % PVDF solution are in the range of 12,000 cP and 3,500 cP respectively. A multilayer was cast as explained in example 1, with the 24 w % solution being cast so it faces the methanol bath, the 20 w % solution facing the support belt. SEM images were taken of the multilayer as given in example 3. Surprisingly, no interface was observed between the two layers. FIG. 6 is a cross-sectional view of the membrane; FIG. 7 is a view of the surface of the membrane at the bath side, showing a skinless tight pore structure; FIG. 8 shows a view of the surface of the membrane at the belt side, showing a skinless open pore structure,

EXAMPLE V

In this example two solutions of the same polymer type and concentration, but different viscosities and temperature treatments are co-cast. The viscosity of the top layer solution was increased by having 5% lithium chloride in the polymer solution. Furthermore, the temperature to which this higher viscosity solution was raised and held was 47.5° C., compared to 44° C. for the lower layer solution. A higher temperature treatment is known to result in a larger membrane pore size for this type of polymer solution.

The solutions were made with the following compositions:

| | [PVDF] | [NMP] | [LiCl] | Treatment temperature [C.] |
|---|---|---|---|---|
| PS1 | 20 | 75 | 5 | 47.5 |
| PS2 | 20 | 80 | 0 | 44 |

Figure 9:
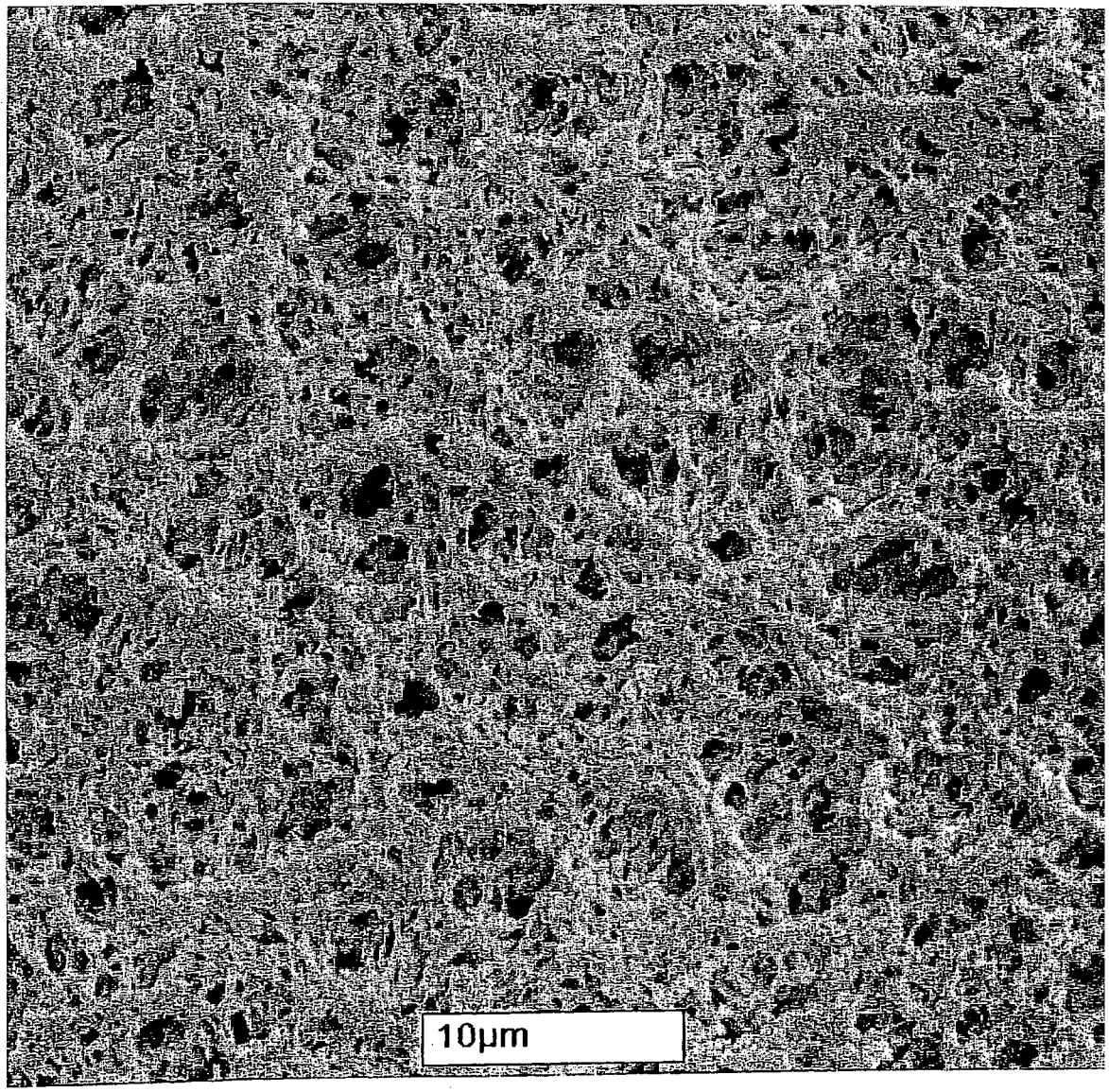
FIG. 9 is a photomicrograph of the top surface of the membrane of FIG. 8.
Figure 10:
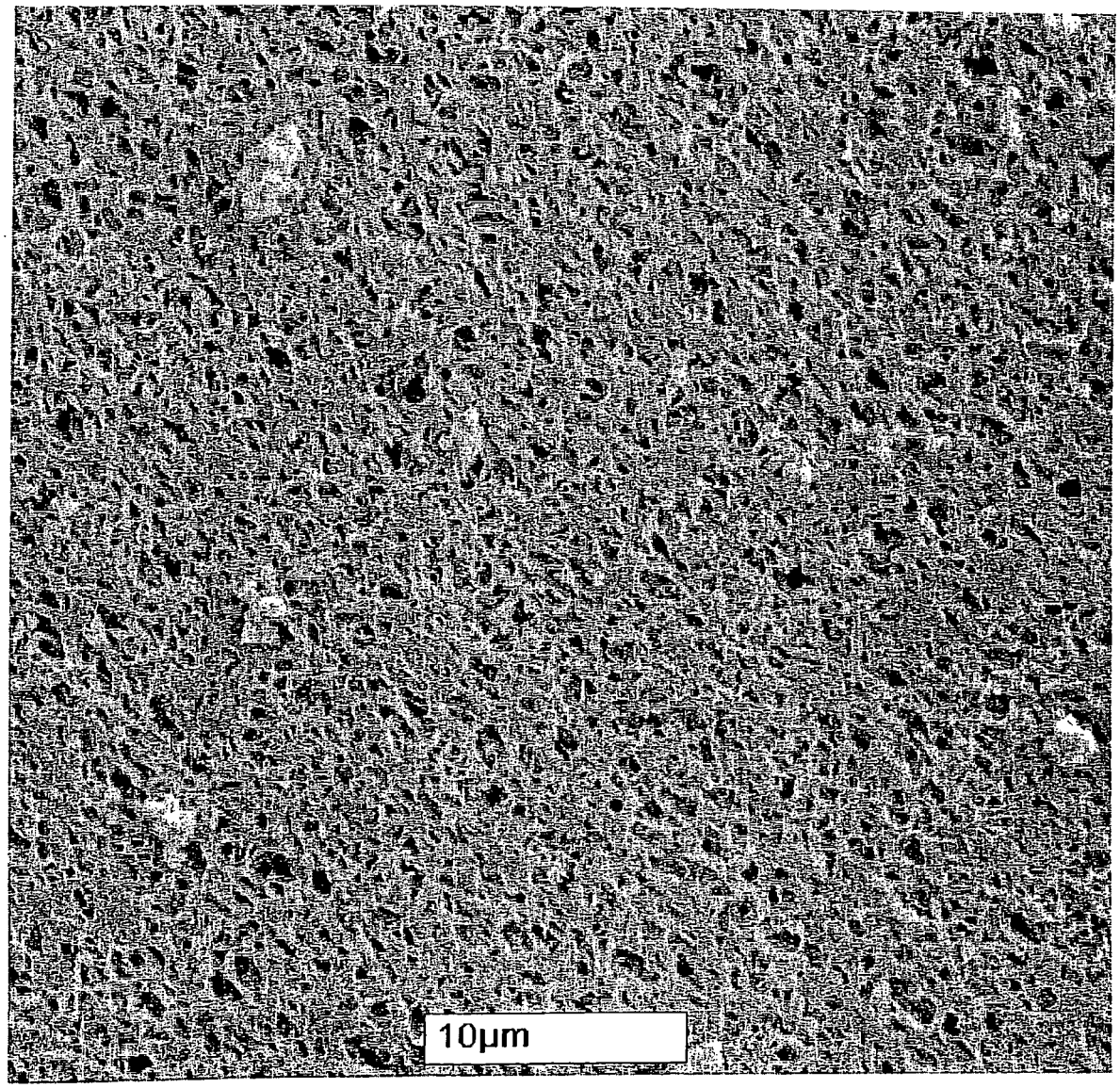
FIG. 10 is a photomicrograph of the bottom surface of the membrane of FIG. 8.
Figure 11:
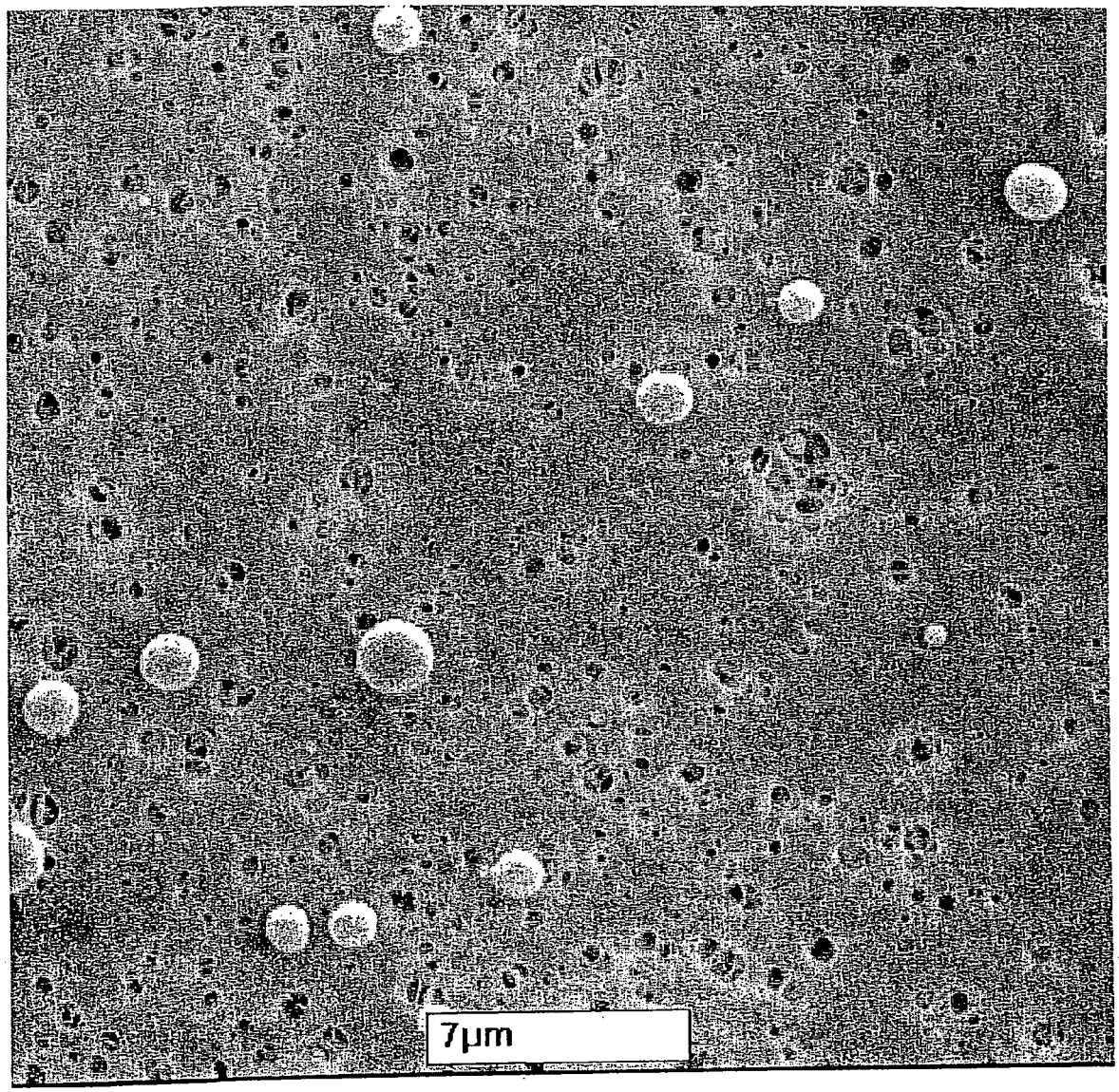
FIG. 11 is a photomicrograph of the top surface of an air cast membrane of this invention.

When a higher viscosity solution (PS1) was used on top of layer of a lower viscosity solution (PS2), structures as displayed in FIGS. 9, 10 and 11 are obtained. Here a more open layer can be observed at the top layer (bath side) (see FIG. 9) compared to the bottom layer (belt side) (see FIG. 10). The difference in pore size is not surprising since the membrane was formed from two individual lacquers with the upper lacquer (PS1) treated to a higher temperature, which will produce a solution giving a larger pore size compared to the lower lacquer (PS2). Viscosity of the upper solution was changed by adding 5% LiCl. Both solutions contained 20 w % PVDF. However these membranes also had no discernable interface between the two layers, which as stated above can be beneficial for membrane performance (see FIG. 11).

EXAMPLE VI

To demonstrate that with the disclosed method, no setting time is required as prior art indicated and that the method is not too dependent on the precise method of diffusion induced phase separation, two membranes were cast using the air-cast method, disclosed by Zeman (in Journal of Membrane Science, Vol. 84, p. 93–106 (1993)). Two polymer solutions of relatively low viscosity solutions were made by dissolving two molecular weights of cellulose acetate in a mixture of acetone and methyl-2,4 pentanediol (MPD). The two different cellulose diacetate polymers are. CA-398-60 with a average Mw of about 240 kDa and CA-398-30 with a Mw of about 174 k Da from Eastman Chemical Products. The first polymer solution (PS3) had the following composition: 9% CA-398-30, 40% MPD and 51% acetone. The second polymer solution (PS4) had the following composition: 9% CA-398-60, 40% MPD and 51% acetone.

Similar solutions were used by Zeman et al. to show the influence of the molecular weight on surface morphology during air casting. By using the co-casting method as explained above, multilayered membranes were made. Since co-casting was used no setting time was allowed between the application of the two layers. Membranes were cast with gap settings of about 30 mil and 16 mil. These membranes were exposed to humid air +/−55% RH at 25 C for 30 minutes. Thereafter the membranes were washed in, water overnight to remove the remaining MPD and finally the membranes were air dried.

Figure 12:
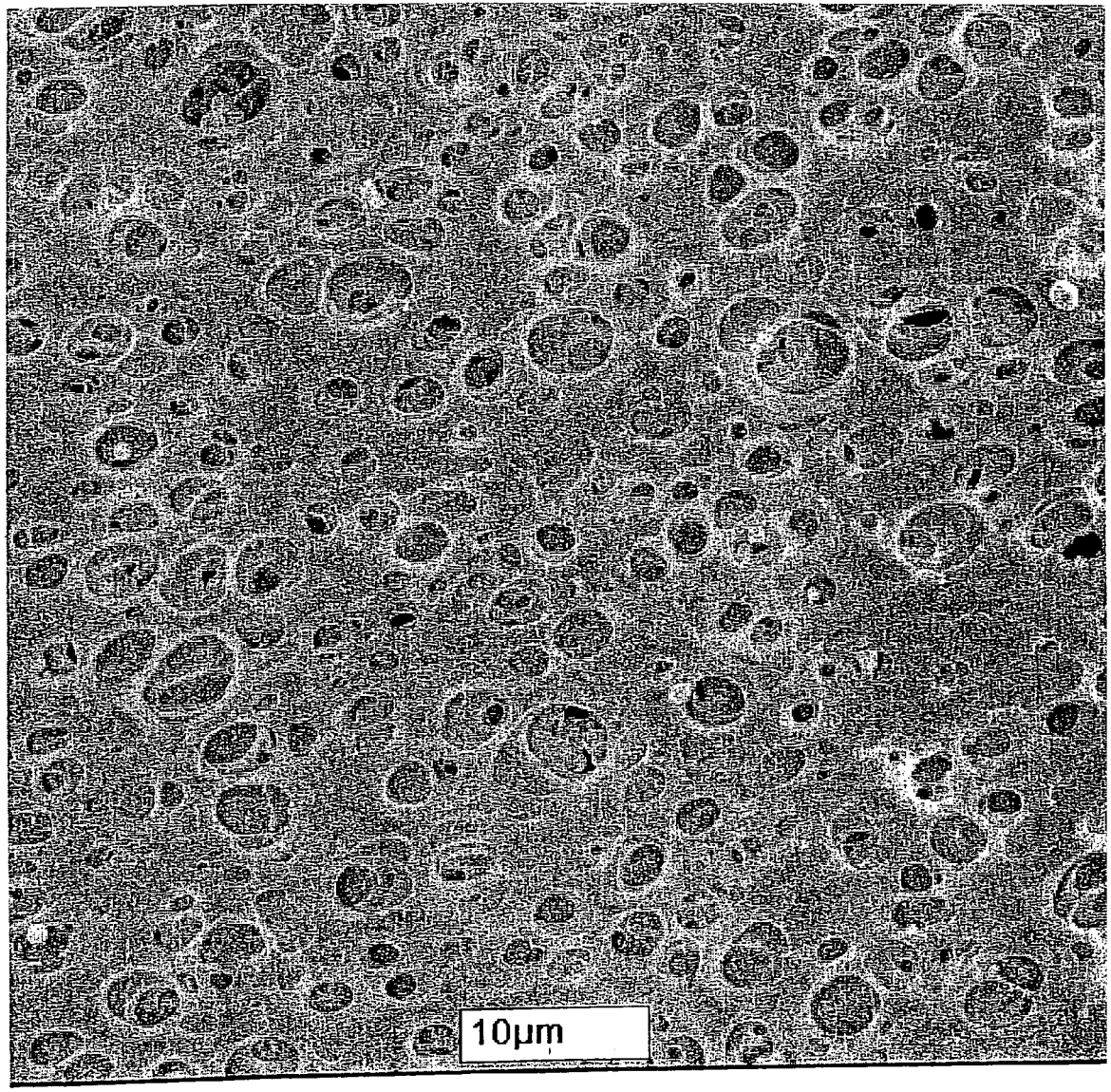
FIG. 12 is a photomicrograph of the bottom surface of an air cast membrane of this invention.
Figure 13:
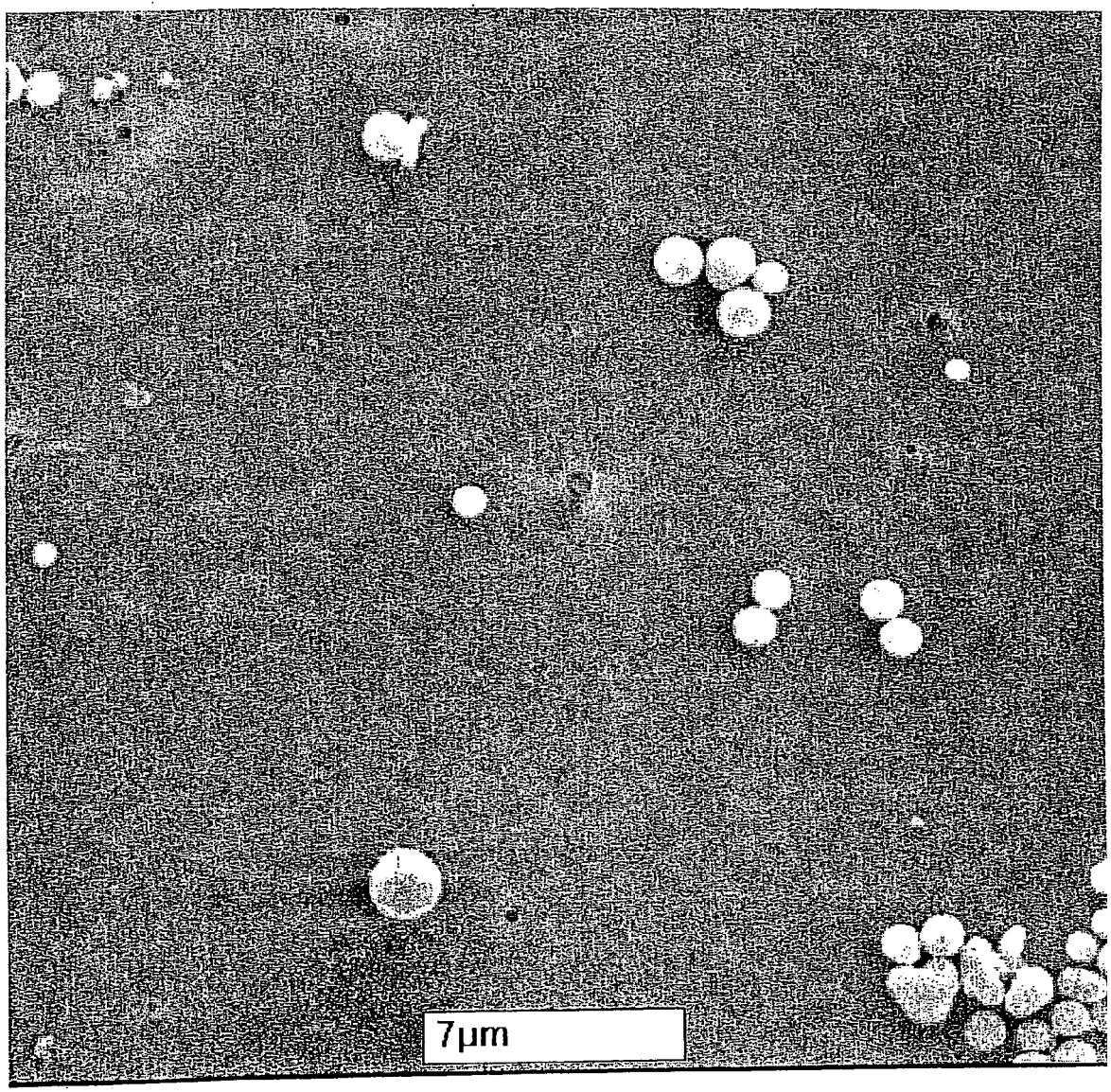
FIG. 13 is a photomicrograph of the top surface of an air cast membrane of this invention.
Figure 14:
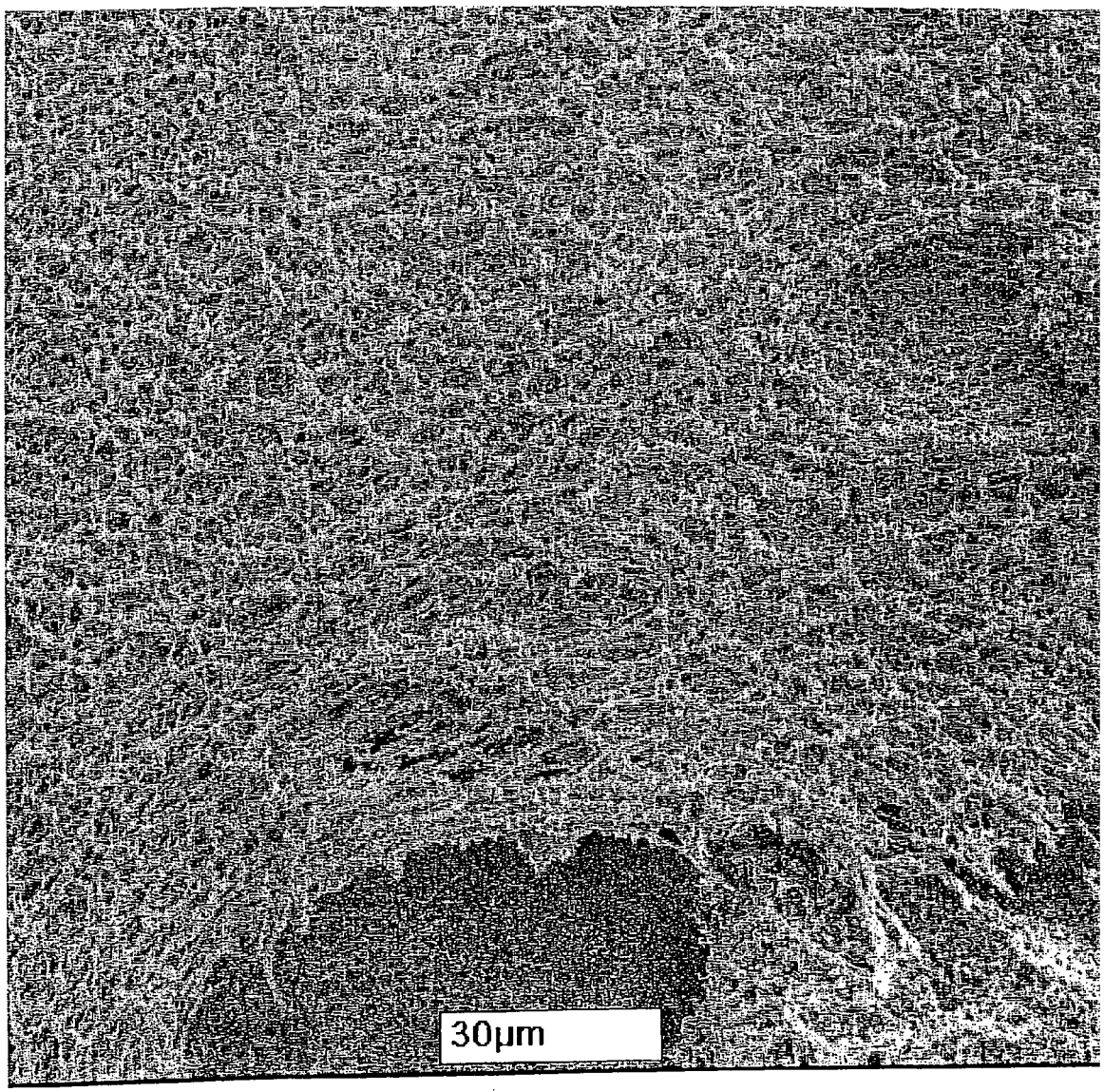
FIG. 14 is a photomicrograph of the bottom surface of an air cast membrane of this invention.

The first membrane was made by applying solution PS3 on top of PS4, while in the second experiment solution PS4 was on top of solution PS3. FIG. 12 and 13 show the two surfaces of the first membrane, while FIGS. 14 and 15 those of the second membrane. In both cases, isolated pores are observed in the surface of the membrane that was exposed to air. It is clear that co-casting enables the deposition of two layers of low viscous materials without an intermediate "setting" step. This clearly demonstrates that the proposed process does not need any control over the setting step and is a clear advantage for process controls.

The inventor has found that co-casting two solutions allows one to control the surface pore size and pore morphology combination for both surfaces. For example, the membrane shown in FIGS. 12 and 13 has a top surface corresponding to the air side surface of a membrane cast from only the solution used for the top surface and a bottom surface formed at the support that corresponds to the bottom surface of a membrane cast only from the polymer solution used to make the bottom layer. Furthermore, the example demonstrates that the surface properties of the multilayer membrane can be designed by choosing the formulation properties of the two solutions: i.e. in this example the molecular weight of the polymer.

EXAMPLE VII

The following two examples VII and VIII demonstrate that different structures can be generated using the cocast method and that this method can be used with other polymers as well.

Two polymer solutions were made with the following concentrations: 15 w % polyethersulphone, 29.7 w % N-methylpyrrolidone and 55.3 w % triethyleneglycol and 11 w % polyethersulphone, 32.0 w % N-methylpyrrolidone and 57.0 w % triethyleneglycol. These solutions were cocast according to the present invention. The first solution was used as the bottom solution, while the latter for the top solution. The cocast film was exposed to air for 3.5 secs at a temperature of 69° F. and a dew point of 20° F. and subsequently immersed in a water bath at 61° C. for about 75 seconds.

The membranes showed a peak IPA bubble point of 27 psi and a water permeability of 2200 lmh/psi. FIG. 15 shows a cross-sectional microphotograph of a multilayered structure of the present invention wherein both layers are asymmetrical.

EXAMPLE VIII

Two polymer solutions were made with the following concentrations: 15 w % polyethersulphone, 29.7 w % N-methylpyrrolidone and 55.3 w % triethyleneglycol and 13 w % polyethersulphone, 14.4 w % N-methylpyrrolidone and 72.6 w % triethyleneglycol. These solutions were cocast according to the present invention. The first solution was used as the bottom solution, while the latter for the top solution. The cocast film was exposed to air for 3.5 secs at a temperature of 68° F. and a dew point of 20° F. and subsequently immersed in a water bath at 55° C. for about 75 seconds.

The membranes showed a peak IPA bubble point of 29 psi and a water permeability of 1700 lmh/psi.

FIG. 16 shows a cross-sectional microphotograph of a multilayered structure of the present invention wherein one layer, in this instance the top layer is symmetrical and the bottom layer is asymmetrical.

A practitioner skilled in the art of developing and producing microporous membranes will be able to discern the advantages of the present invention. It is not the intent of the discussion of the present invention to exhaustively present all combinations, substitutions or modifications that are possible, but to present representative methods for the edification of the skilled practitioner. Representative examples have been given to demonstrate reduction to practice and are not to be taken as limiting the scope of the present invention. The inventor seeks to cover the broadest aspects of the invention in the broadest manner known at the time the claims were made.

What is claimed:

1. A process for forming an integral, unsupported, multizone microporous membrane having at least two zones, comprising the acts of:

operatively positioning relative to a continuously moving coating surface at least one polymer applying apparatus having at least two polymer dispensing outlets in chambers with a front wall and a back wall and a separating wall between the front wall and the back wall defining the volumes of the chambers;

co-casting polymer from each of the polymer dispensing outlets onto the continuously moving coating surface so as to create a multiple layer polymer coating on the coating surface, wherein the polymer is dispensed from the chambers by gravity, fluid pressure, or pumping;

subjecting the multiple polymer layer coating to a phase separation procedure so as to form a wet multizone microporous membrane; and separating the wet multizone microporous membrane from the continuously moving coating surface at some point prior to complete drying of the membrane.

2. The process of claim 1, wherein the back wall is held above the continuously moving coating surface to form a back wall gap, and said back wall gap, surface speed, and polymer solution viscosity are adjusted to prevent the polymer solution from leaking out through the back wall gap.

3. The process of claim 2, wherein the polymer is dispensed from the chambers using fluid pressure.

4. The process of claim 2, wherein the polymer is dispensed from the chambers using pumping.

5. A process for forming an integral, unsupported, multizone microporous membrane having at least two zones, comprising the acts of:

operatively positioning at least one polymer applying apparatus having at least two polymer dispensing outlets relative to a continuously moving coating surface;

co-casting polymer from each of the polymer dispensing outlets onto the continuously moving coating surface so as to create a multiple layer polymer coating on the coating surface, wherein the thicknesses of each layer can be controlled by one or more factors selected from the group consisting of gap distance, solution viscosity, coating surface speed, polymer fluid pressure, and pumping of polymer solutions through the polymer dispensing outlets;

subjecting the multiple polymer layer coating to a phase separation procedure so as to form a wet multizone microporous membrane; and separating the wet multizone microporous membrane from the continuously moving coating surface at some point prior to complete drying of the membrane.

6. A process for forming an unsupported, multizone microporous membrane having at least two zones, comprising the acts of:

operatively positioning at least one polymer applying apparatus having at least two polymer dispensing outlets relative to a coating surface;

co-casting polymer from each of the polymer dispensing outlets onto the coating surface so as to create a multiple layer polymer coating on the coating surface, wherein the polymer is dispensed from chambers through the polymer dispensing outlets by gravity, fluid pressure or pumping;

subjecting the multiple polymer layer coating to a phase separation procedure so as to form a wet multizone microporous membrane; and separating the wet multizone microporous membrane from the coating surface at some point prior to complete drying of the membrane.

7. The process of claim 1 or 6, wherein the polymer is dispensed from the chambers using fluid pressure or pumping.

8. The process of claim 1 or 6 further comprising:
heating or cooling the chambers.

9. The process of claim 1 or 6, wherein the polymer comprises:
nylon.

10. The process of claim 1 or 6, wherein the polymer comprises:
polyvinylidene fluoride.

11. The process of claim 1 or 6, wherein the polymer comprises:
polyethersulfone.

12. The process of claim 1 or 6 further comprising the acts of:
washing and drying the membrane.

13. The process of claim 1 or 6, wherein the zones of the multizone microporous membrane have different pore sizes.

14. A process for forming an unsupported, multizone microporous membrane having at least two zones, comprising the acts of:

operatively positioning at least one polymer applying apparatus having at least two polymer dispensing outlets relative to a coating surface;

co-casting polymer from each of the polymer dispensing outlets onto the coating surface so as to create a multiple layer polymer coating on the coating surface, wherein the thicknesses of each layer can be controlled by one or more factors selected from the group consisting of gap distance, solution viscosity, coating surface speed, polymer fluid pressure, and pumping of polymer solutions through the polymer dispensing outlets;

subjecting the multiple polymer layer coating to a phase separation procedure so as to form a wet multizone microporous membrane; and separating the wet multizone microporous membrane from the coating surface at some point prior to complete drying of the membrane.

15. The process of claim 5 or 14, wherein the thicknesses of the layers are controlled by factors selected from the group consisting of solution viscosity, coating surface speed, polymer fluid pressure, and pumping of polymer solutions through the polymer dispensing outlets.

16. The process of claim 5 or 14, wherein the solution viscosity is controlled by heating or cooling.

17. A process for forming an integral, unsupported, multizone microporous membrane having at least two zones, comprising the acts of:

operatively positioning relative to a continuously moving coating surface at least one polymer applying apparatus having at least two polymer dispensing outlets in chambers with a front wall and a back wall and a separating wall between the front wall and the back wall defining the volumes of the chambers, wherein polymer solution is pumped into the polymer applying apparatus;

co-casting polymer from each of the polymer dispensing outlets onto the continuously moving coating surface so as to create a multiple layer polymer coating on the coating surface, wherein the polymer is dispensed from the chambers;

subjecting the multiple polymer layer coating to a phase separation procedure so as to form a wet multizone microporous membrane; and separating the wet multizone microporous membrane from the continuously moving coating surface at some point prior to complete drying of the membrane.

18. A process for forming an integral, unsupported, multizone microporous membrane having at least two zones, comprising the acts of:

operatively positioning at least one polymer applying apparatus having at least two polymer dispensing outlets relative to a continuously moving coating surface, wherein polymer is pumped into the polymer applying apparatus;

co-casting polymer from each of the polymer dispensing outlets onto the continuously moving coating surface so as to create a multiple layer polymer coating on the coating surface;

subjecting the multiple polymer layer coating to a phase separation procedure so as to form a wet multizone microporous membrane; and separating the wet multizone microporous membrane from the continuously moving coating surface at some point prior to complete drying of the membrane.

19. A process for forming an unsupported, multizone microporous membrane having at least two zones, comprising the acts of:

operatively positioning at least one polymer applying apparatus having at least two polymer dispensing outlets relative to a coating surface, wherein polymer is pumped into the polymer applying apparatus;

co-casting polymer from each of the polymer dispensing outlets onto the coating surface so as to create a multiple layer polymer coating on the coating surface;

subjecting the multiple polymer layer coating to a phase separation procedure so as to form a wet multizone microporous membrane; and separating the wet multizone microporous membrane from the coating surface at some point prior to complete drying of the membrane.

20. A process for forming an unsupported, multizone microporous membrane having at least two zones, comprising the acts of:

operatively positioning at least one polymer applying apparatus having at least two polymer dispensing outlets relative to a coating surface, wherein polymer is pumped into the polymer applying apparatus;

co-casting polymer from each of the polymer dispensing outlets onto the coating surface so as to create a multiple layer polymer coating on the coating surface;

subjecting the multiple polymer layer coating to a phase separation procedure so as to form a wet multizone microporous membrane; and separating the wet multizone microporous membrane from the coating surface at some point prior to complete drying of the membrane.

* * * * *